US010815853B2

(12) United States Patent
Shirasawa et al.

(10) Patent No.: US 10,815,853 B2
(45) Date of Patent: Oct. 27, 2020

(54) ABNORMALITY DIAGNOSIS SYSTEM FOR AN EXHAUST GAS PURIFICATION APPARATUS

(71) Applicant: TOYOTA JIDOSHA KABUSHIKI KAISHA, Toyota-shi, Aichi-ken (JP)

(72) Inventors: Takeru Shirasawa, Susono (JP); Toru Kidokoro, Hadano (JP); Makoto Ogiso, Mishima (JP); Kenji Furui, Sunto-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 1 day.

(21) Appl. No.: 16/227,665

(22) Filed: Dec. 20, 2018

(65) Prior Publication Data

US 2019/0195107 A1    Jun. 27, 2019

(30) Foreign Application Priority Data

Dec. 26, 2017   (JP) .................................. 2017-250032

(51) Int. Cl.
*F01N 3/20* (2006.01)
*B01D 53/94* (2006.01)
*F01N 11/00* (2006.01)

(52) U.S. Cl.
CPC ......... *F01N 3/208* (2013.01); *B01D 53/9409* (2013.01); *B01D 53/9431* (2013.01); *B01D 53/9495* (2013.01); *F01N 11/007* (2013.01); *B01D 2251/2062* (2013.01); *F01N 2550/02* (2013.01); *F01N 2610/02* (2013.01); *F01N 2900/1616* (2013.01)

(58) Field of Classification Search
CPC ........ B01D 2251/2062; B01D 53/9409; B01D 53/9431; B01D 53/9495; F01N 11/007; F01N 2550/02; F01N 2610/02; F01N 2900/1616; F01N 3/208
See application file for complete search history.

(56) References Cited

U.S. PATENT DOCUMENTS 8,074,445 B2 * 12/2011 Ofoli ..................... B01D 53/90
                                                            60/286
9,091,194 B2 *  7/2015 Ardanese ............... F01N 9/007
(Continued)

FOREIGN PATENT DOCUMENTS

JP         2013-227930         11/2013

*Primary Examiner* — Anthony Ayala Delgado
(74) *Attorney, Agent, or Firm* — Finnegan, Henderson, Farabow, Garrett & Dunner, LLP

(57) ABSTRACT

When an abnormality diagnosis of an SCR catalyst is carried out, diagnostic supply control is carried out in such a manner that the first estimated adsorption amount, which is an amount of adsorption of ammonia in the SCR catalyst at the time when the SCR catalyst is assumed to be in a predetermined abnormal state, becomes equal to or more than a first predetermined adsorption amount, and the second estimated adsorption amount, which is an amount of adsorption of ammonia in the SCR catalyst at the time when the SCR catalyst is assumed to be in a predetermined normal state, becomes smaller than a second predetermined adsorption amount. Then, supply decreasing control to decrease an amount of adsorption of ammonia in the SCR catalyst is carried out, after the end of the execution of the diagnostic supply control.

5 Claims, 12 Drawing Sheets

(56) References Cited

U.S. PATENT DOCUMENTS

| | | | |
|---|---|---|---|
| 9,133,749 B2 * | 9/2015 | Gady | F01N 3/103 |
| 10,392,993 B1 * | 8/2019 | Mori | F01N 3/2066 |
| 10,480,375 B2 * | 11/2019 | Khaled | F01N 3/2066 |
| 2010/0028230 A1 * | 2/2010 | Gady | F01N 3/208 |
| | | | 423/239.1 |
| 2012/0017567 A1 * | 1/2012 | Geveci | F01N 13/0093 |
| | | | 60/274 |

* cited by examiner

ABNORMALITY DIAGNOSIS SYSTEM FOR AN EXHAUST GAS PURIFICATION APPARATUS

This application claims the benefit of Japanese Patent Application No. 2017-250032, filed on Dec. 26, 2017, which is hereby incorporated by reference herein in its entirety.

BACKGROUND

Technical Field

The present disclosure relates to an abnormality diagnosis system for an exhaust gas purification apparatus.

Description of the Related Art

There has been known a technique in which an NOx selective reduction catalyst (hereinafter, sometimes also referred to simply as an "SCR catalyst") for reducing NOx contained in an exhaust gas from an internal combustion engine by using ammonia as a reducing agent is arranged in an exhaust passage of the internal combustion engine as an exhaust gas purification catalyst. In the case where the SCR catalyst is arranged in the exhaust passage, an ammonia supply device is arranged in the exhaust passage at the upstream side of the SCR catalyst. The ammonia supply device serves to supply ammonia to the SCR catalyst by adding ammonia or a precursor of ammonia into an exhaust gas flowing through the exhaust passage.

In addition, in patent literature 1, there is described a technique of making an abnormality diagnosis of an SCR catalyst based on a detected value of an ammonia sensor arranged in an exhaust passage at the downstream side of the SCR catalyst. More specifically, in this technique described in the patent literature 1, a slip ratio of ammonia, which is a ratio of an amount of ammonia slipped from the SCR catalyst to an amount of ammonia supplied to the SCR catalyst, is calculated based on the detected value of the ammonia sensor. Then, in cases where the slip ratio of ammonia thus calculated is equal to or larger than a threshold value, a determination is made that the SCR catalyst has deteriorated.

CITATION LIST

Patent Literature

Patent Literature 1: Japanese patent application laid-open publication No. 2013-227930

SUMMARY

In the above-mentioned conventional technique, an abnormality diagnosis of the SCR catalyst is carried out by using the tendency that in cases where abnormality has occurred in the SCR catalyst, ammonia becomes easy to slip from the SCR catalyst. However, depending on the construction of the exhaust gas purification apparatus, the operating state of the internal combustion engine, etc., a situation may arise in which even if abnormality has occurred in the SCR catalyst, ammonia does not slip from the SCR catalyst because an amount of adsorption of ammonia adsorbed to the SCR catalyst is small when an execution condition for the abnormality diagnosis is satisfied. In other words, in order to carry out the abnormality diagnosis of the SCR catalyst by detecting the ammonia slipped from the SCR catalyst, it is necessary for a suitable amount of ammonia to be adsorbed to the SCR catalyst when carrying out the abnormality diagnosis. However, the amount of adsorption of ammonia in the SCR catalyst may not necessarily become a suitable amount for the abnormality diagnosis at timing when the execution of the abnormality diagnosis of the SCR catalyst is required. In such a case, it may become difficult to ensure an opportunity for the execution of the abnormality diagnosis of the SCR catalyst.

The present disclosure has been made in view of the problems as referred to above, and has for its object to ensure an opportunity for the execution of an abnormality diagnosis of an SCR catalyst in an appropriate manner.

An abnormality diagnosis system for an exhaust gas purification apparatus according to the present disclosure is applied to an exhaust gas purification apparatus including: an NOx selective reduction catalyst that is arranged in an exhaust passage of the internal combustion engine, and reduces NOx in an exhaust gas by using ammonia as a reducing agent; and an ammonia supply device that is arranged in the exhaust passage at the upstream side of the NOx selective reduction catalyst, and supplies ammonia to the NOx selective reduction catalyst; wherein the abnormality diagnosis system may comprise a controller comprising at least one processor configured to carry out an abnormality diagnosis of the NOx selective reduction catalyst; wherein the controller detects a concentration of ammonia in the exhaust gas at the downstream side of the NOx selective reduction catalyst; estimates a first estimated adsorption amount which is an amount of adsorption of ammonia in the NOx selective reduction catalyst at the time when the NOx selective reduction catalyst is assumed to be in a predetermined abnormal state; estimates a second estimated adsorption amount which is an amount of adsorption of ammonia in the NOx selective reduction catalyst at the time when the NOx selective reduction catalyst is assumed to be in a predetermined normal state; carries out diagnostic supply control to supply ammonia by the ammonia supply device at the time of carrying out the abnormality diagnosis of the NOx selective reduction catalyst, in such a manner that when an amount of adsorption of ammonia in the NOx selective reduction catalyst at the time when ammonia begins to slip from the NOx selective reduction catalyst in the case where the NOx selective reduction catalyst is in the predetermined abnormal state is defined as a first slip development adsorption amount, and when an amount of adsorption of ammonia in the NOx selective reduction catalyst at the time when ammonia begins to slip from the NOx selective reduction catalyst in the case where the NOx selective reduction catalyst is in the predetermined normal state is defined as a second slip development adsorption amount, the first estimated adsorption amount becomes equal to or more than a first predetermined adsorption amount which is equal to or more than the first slip development adsorption amount, and the second estimated adsorption amount becomes smaller than a second predetermined adsorption amount which is equal to or less than the second slip development adsorption amount; carries out the abnormality diagnosis of the NOx selective reduction catalyst based on the concentration of ammonia detected by the ammonia detection unit when the diagnostic supply control is carried out; and carries out decreasing control to decrease the amount of adsorption of ammonia in the NOx selective reduction catalyst after the end of the execution of the diagnostic supply control, in such a manner that a difference between the second estimated adsorption amount and the second predetermined adsorption amount is made larger than a difference between the first estimated adsorption amount and the first predetermined adsorption amount.

In the abnormality diagnosis system according to the present disclosure, the first estimated adsorption amount may be estimated by the controller, and the second estimated adsorption amount may be estimated by the controller. Here, the first estimated adsorption amount is an amount of adsorption of ammonia in the SCR catalyst at the time of assuming that the SCR catalyst is in the predetermined abnormal state (i.e., a state in which it should be diagnosed that abnormality has occurred in the SCR catalyst, in the abnormality diagnosis). In addition, the second estimated adsorption amount is an amount of adsorption of ammonia in the SCR catalyst at the time of assuming that the SCR catalyst is in the normal state (i.e., a state in which it should be diagnosed that the SCR catalyst is normal, in the abnormality diagnosis).

Here, in the SCR catalyst, when the amount of adsorption of ammonia increases up to a certain extent, it becomes unable to fully adsorb the ammonia newly supplied to the SCR catalyst, thus giving rise to a slip of ammonia in which ammonia flows out from the SCR catalyst. Then, when abnormality occurs in the SCR catalyst, the slip of ammonia begins to occur in a state where the amount of adsorption of ammonia is smaller in comparison with the case when the SCR catalyst is normal. Accordingly, in cases where the amount of adsorption of ammonia in the SCR catalyst at the time when ammonia begins to slip from the SCR catalyst in the case where the SCR catalyst is in the predetermined abnormal state is defined as the first slip development adsorption amount, and in cases where the amount of adsorption of ammonia in the SCR catalyst at the time when ammonia begins to slip from the SCR catalyst in the case where the SCR catalyst is in the predetermined normal state is defined as the second slip development adsorption amount, the first slip development adsorption amount becomes smaller than the second slip development adsorption amount.

Then, in the present disclosure, at the time of carrying out the abnormality diagnosis of the SCR catalyst, the diagnostic supply control may be carried out by the controller in such a manner that the first estimated adsorption amount becomes equal to or more than the first predetermined adsorption amount which is equal to or more than the first slip development adsorption amount, and the second estimated adsorption amount becomes smaller than the second predetermined adsorption amount which is equal to or less than the second slip development adsorption amount.

When the diagnostic supply control as mentioned above is carried out, ammonia will not slip from the SCR catalyst in the case where the actual state of the SCR catalyst is normal, but ammonia will slip from the SCR catalyst in the case where it is abnormal. Then, if ammonia slips from the SCR catalyst, the ammonia thus slipped will be detected by the ammonia detection unit. For that reason, by carrying out the diagnostic supply control, it becomes possible for the controller to carry out the abnormality diagnosis of the SCR catalyst based on the concentration of ammonia detected by the ammonia detection unit.

Here, when the diagnostic supply control is carried out, ammonia is newly supplied to the SCR catalyst by means of the ammonia supply device, so the first estimated adsorption amount and the second estimated adsorption amount are both increased. The amounts of increase at this time in the first estimated adsorption amount and the second estimated adsorption amount are substantially equal to each other. Then, after the end of the execution of the diagnostic supply control, a portion of the first estimated adsorption amount exceeding the first slip development adsorption amount will slip from the SCR catalyst, so the first estimated adsorption amount quickly decreases to the first slip development adsorption amount. On the other hand, even after the end of the execution of the diagnostic supply control, the second estimated adsorption amount is smaller than the second slip development adsorption amount, and hence, is generally hard to decrease from the amount once increased.

In that case, at the time of the next abnormality diagnosis of the SCR catalyst, when ammonia is supplied by the ammonia supply device so as to increase the first estimated adsorption amount again more than the first predetermined adsorption amount, the second estimated adsorption amount may increase to an extent comparable to an amount of increase of the first predetermined adsorption amount, so it may reach the second predetermined adsorption amount or more. In other words, it may become difficult to carry out the diagnostic supply control to supply ammonia in such a manner that the first estimated adsorption amount becomes equal to or more than the first predetermined adsorption amount and the second estimated adsorption amount becomes smaller than the second predetermined adsorption amount. In this case, the next abnormality diagnosis of the SCR catalyst by the abnormality diagnosis unit will become unable to be made.

Accordingly, in the present disclosure, after the end of the execution of the diagnostic supply control by the supply control unit, the controller may carry out the decreasing control to decrease the amount of adsorption of ammonia in the SCR catalyst. When the decreasing control is carried out, both the first estimated adsorption amount and the second estimated adsorption amount will decrease, but the decreasing control is carried out so that the difference between the second estimated adsorption amount and the second predetermined adsorption amount becomes larger than the difference between the first estimated adsorption amount and the first predetermined adsorption amount.

Here, as mentioned above, after the end of the execution of the diagnostic supply control by the supply control unit, the first estimated adsorption amount quickly decreases up to the first slip development adsorption amount. However, when the amount of adsorption of ammonia in the SCR catalyst decreases up to the first slip development adsorption amount or less, an NOx reduction rate in the SCR catalyst becomes lower in comparison with the case when the amount of adsorption of ammonia in the SCR catalyst is larger than the first slip development adsorption amount. In other words, the ammonia adsorbed to the SCR catalyst becomes hard to be consumed for the reduction of NOx. For that reason, in cases where the decreasing control is carried out, the decreasing rate of the first estimated adsorption amount after the first estimated adsorption amount has decreased to the first slip development adsorption amount becomes smaller than the decreasing rate of the second estimated adsorption amount. Accordingly, by carrying out the decreasing control continuously to some extent, the difference between the second estimated adsorption amount and the second predetermined adsorption amount can be made larger than the difference between the first estimated adsorption amount and the first predetermined adsorption amount.

Then, when the difference between the second estimated adsorption amount and the second predetermined adsorption amount becomes larger than the difference between the first estimated adsorption amount and the first predetermined adsorption amount by carrying out the decreasing control, it becomes possible to make the first estimated adsorption amount equal to or more than the first predetermined adsorption amount, and to make the second estimated adsorption amount smaller than the second predetermined adsorption amount, when the first estimated adsorption amount and the second estimated adsorption amount have again increased to the same extent. In other words, at the time of the next abnormality diagnosis of the SCR catalyst, it becomes possible to carry out the diagnostic supply control. As a result, the next abnormality diagnosis of the SCR catalyst can be made.

As described above, according to the present disclosure, by carrying out the diagnostic supply control and carrying out the decreasing control, the amount of adsorption of ammonia in the SCR catalyst can be adjusted to an amount suitable for the abnormality diagnosis of the SCR catalyst based on the concentration of ammonia slipping from the SCR catalyst, in a repeated manner. Accordingly, it is possible to ensure an opportunity for the execution of the abnormality diagnosis of the SCR catalyst in an appropriate manner.

In addition, in the present disclosure, the decreasing control may also include supply decreasing control to decrease an amount of supply of ammonia from the ammonia supply device to smaller than an amount which becomes an equivalent to an inflow amount of NOx flowing into the SCR catalyst. When the supply decreasing control is carried out, an amount of ammonia consumed for the reduction of NOx in the SCR catalyst becomes more than an amount of ammonia newly supplied to the SCR catalyst. For that reason, the amount of adsorption of ammonia in the SCR catalyst can be decreased by carrying out the supply decreasing control.

Moreover, the decreasing control may also include temperature rise control to raise the temperature of the SCR catalyst to a predetermined desorption temperature at which ammonia desorbs from the SCR catalyst, even if the SCR catalyst is in the predetermined normal state. As the temperature of the SCR catalyst goes up, an upper limit adsorption amount of ammonia in the SCR catalyst becomes smaller. For that reason, when the temperature of the SCR catalyst is raised to the predetermined desorption temperature at which the upper limit adsorption amount becomes smaller than a current amount of adsorbed ammonia in the SCR catalyst, ammonia desorbs from the SCR catalyst. Accordingly, the amount of adsorption of ammonia in the SCR catalyst can be decreased by carrying out the temperature rise control.

Further, the decreasing control may also include oxidation control to oxidize the ammonia adsorbed to the SCR catalyst. Here, the oxidation control is to control the temperature of the SCR catalyst to a temperature at which ammonia can be oxidized, as well as control the oxygen concentration of the exhaust gas flowing into the SCR catalyst to an oxygen concentration at which ammonia can be oxidized. When the oxidation control is carried out, the ammonia adsorbed to the SCR catalyst is oxidized to produce NOx. Then, the NOx thus produced is reduced by using the ammonia remaining in the SCR catalyst as the reducing agent. Accordingly, by carrying out the oxidation control, the amount of adsorption of ammonia in the SCR catalyst can be decreased, while suppressing the outflow of ammonia from the SCR catalyst as well as the outflow of NOx from the SCR catalyst.

Here, note that the rate of reduction of NOx in the SCR catalyst changes according to the amount of adsorption of ammonia in the SCR catalyst. In other words, as the amount of adsorption of ammonia in the SCR catalyst decreases, the rate of reduction of NOx in the SCR catalyst decreases. Accordingly, in cases where the controller carries out the oxidation control as the decreasing control, the decreasing control unit may change a target rate of oxidation in the oxidation control according to the second estimated adsorption amount which should be decreased by carrying out the oxidation control. In other words, when the second estimated adsorption amount is small, the target rate of oxidation in the oxidation control may be made smaller in comparison with the case when the second estimated adsorption amount is large. At this time, by adjusting the temperature of the SCR catalyst or the oxygen concentration of the exhaust gas, the rate of oxidation of ammonia in the SCR catalyst may be controlled to become smaller as the second estimated adsorption amount is smaller. According to this, by carrying out the oxidation control, a decrease in the amount of adsorption of ammonia in the SCR catalyst can be promoted, while suppressing the NOx produced in the SCR catalyst from flowing out from the SCR catalyst.

According to the present disclosure, it is possible to ensure an opportunity for the execution of the abnormality diagnosis of the SCR catalyst in an appropriate manner.

DESCRIPTION OF THE EMBODIMENTS

Hereinafter, specific modes or embodiments of the present disclosure will be described based on the attached drawings.

However, the dimensions, materials, shapes, relative arrangements and so on of component parts described in the embodiments are not intended to limit the technical scope of the present disclosure to these alone in particular as long as there are no specific statements.

First Embodiment (Schematic Construction)

Figure 1:
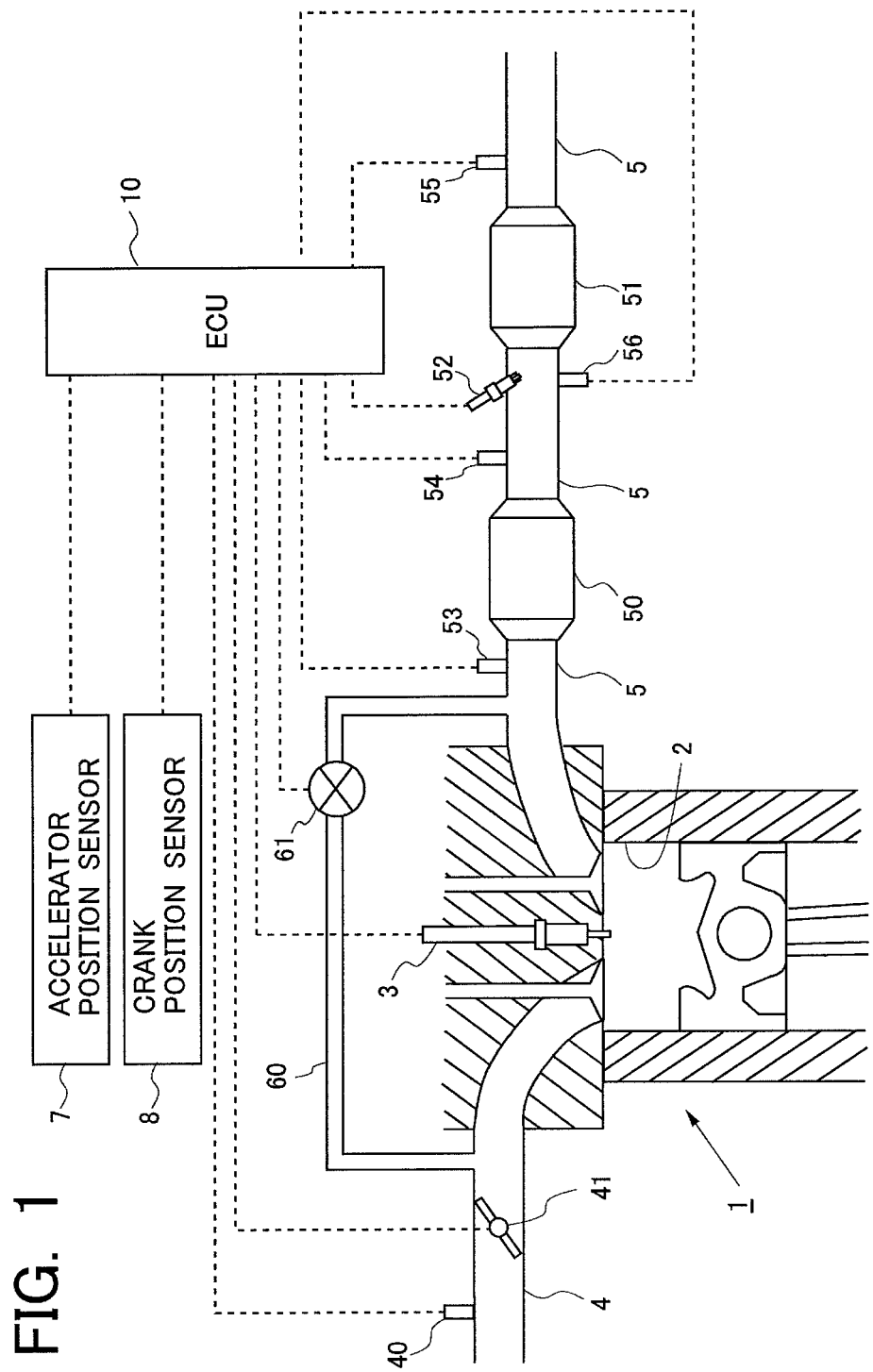
FIG. 1 is a view indicating the schematic construction of an internal combustion engine and its intake and exhaust systems according to a first embodiment.

FIG. 1 is a view indicating the schematic construction of an internal combustion engine and its intake and exhaust systems according to a first embodiment. The internal combustion engine 1 indicated in FIG. 1 is an internal combustion engine of compression ignition type (diesel engine). However, the present disclosure can also be applied to a lean burn internal combustion engine of spark ignition type which uses gasoline or the like as fuel.

The internal combustion engine 1 is provided with a fuel injection valve 3 for injecting fuel into a cylinder 2. Here, note that in cases where the internal combustion engine 1 is an internal combustion engine of spark ignition type, the fuel injection valve 3 may be constructed such that fuel is injected to an intake port.

The internal combustion engine 1 is connected to an intake passage 4. In the intake passage 4, there are arranged an air flow meter 40 and a throttle valve 41. The air flow meter 40 outputs an electrical signal corresponding to an amount (mass) of intake air (air) flowing in the intake passage 4. The throttle valve 41 is arranged in the intake passage 4 at the downstream side of the air flow meter 40. The throttle valve 41 serves to adjust the amount of intake air in the internal combustion engine 1 by changing the channel cross section of the intake passage 4.

The internal combustion engine 1 is connected to an exhaust passage 5. In the exhaust passage 5, there are arranged a first NOx sensor 53, an NOx storage reduction catalyst 50 (hereinafter, sometimes also referred to as an "NSR catalyst 50"), a second NOx sensor 54, a urea water addition valve 52, a temperature sensor 56, an NOx selective reduction catalyst 51 (hereinafter, sometimes also referred to as an SCR catalyst 51) and a third NOx sensor 55 sequentially according to the flow of exhaust gas. The NSR catalyst 50 stores or adsorbs NOx contained in the exhaust gas when the air fuel ratio of the exhaust gas is a lean air fuel ratio higher than a stoichiometric air fuel ratio, whereas the NSR catalyst 50 releases the NOx stored or adsorbed therein when the air fuel ratio of the exhaust gas is a rich air fuel ratio lower than the stoichiometric air fuel ratio, and at the same time, promotes reaction between the NOx thus released and reducing components (e.g., hydrocarbon (HC), carbon monoxide (CO), etc.) in the exhaust gas. The SCR catalyst 51 has a function to reduce the NOx in the exhaust gas by using ammonia as a reducing agent. Here, the urea water addition valve 52 arranged at the upstream side of the SCR catalyst 51 serves to add urea water into the exhaust gas flowing in the exhaust passage 5. When the urea water is added from the urea water addition valve 52, ammonia is produced by hydrolysis of the urea contained in the urea water. As a result of this, ammonia as the reducing agent is supplied to the SCR catalyst 51. The ammonia thus supplied to the SCR catalyst 51 is adsorbed to the SCR catalyst 51. Then, in the SCR catalyst 51, the NOx in the exhaust gas is reduced by using, as the reducing agent, the ammonia thus adsorbed. Here, note that in this embodiment, the urea water addition valve 52 corresponds to an "ammonia supply device" according to the present disclosure. In addition, in place of the urea water addition valve 52, there may be arranged an ammonia addition valve that serves to add ammonia gas into the exhaust gas. In this case, the ammonia addition valve corresponds to the "ammonia supply device" according to the present disclosure.

In addition, the temperature sensor 56 outputs an electrical signal corresponding to the temperature of the exhaust gas. Moreover, each of the first NOx sensor 53, the second NOx sensor 54 and the third NOx sensor 55 detects not only the concentration of NOx in the exhaust gas, but also the concentration of ammonia. In other words, each of the NOx sensors 53, 54 and 55 outputs an electrical signal corresponding to the concentrations of NOx and ammonia in the exhaust gas.

Moreover, the exhaust passage 5 and the intake passage 4 of the internal combustion engine 1 are put into fluid communication with each other by means of an EGR passage 60. The EGR passage 60 has one end thereof connected to the exhaust passage 5 at a location upstream of the NSR catalyst 50. Also, the EGR passage 60 has the other end thereof connected to the intake passage 4 at a location downstream of the throttle valve 41. Then, a part of the exhaust gas flowing through the exhaust passage 5 is introduced as an EGR gas into the intake passage 4 through the EGR passage 60. In addition, an EGR valve 61 is arranged in the EGR passage 60. The flow rate of the EGR gas flowing through the EGR passage 60 is adjusted by controlling the degree of opening of the EGR valve 61, so that an EGR ratio in the intake air flowing into the internal combustion engine 1 is thereby adjusted.

Then, an electronic control unit (ECU) 10 is provided in combination with the internal combustion engine 1. The ECU 10 is a unit that controls the operating state of the internal combustion engine 1, etc. A variety of kinds of sensors such as an accelerator position sensor 7, a crank position sensor 8, etc., in addition to the air flow meter 40, the first NOx sensor 53, the second NOx sensor 54, the third NOx sensor 55, the temperature sensor 56 as mentioned above, are electrically connected to the ECU 10. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with a rotational position of an engine output shaft (crankshaft) of the internal combustion engine 1. Then, the output signals of these sensors are inputted to the ECU 10. The ECU 10 derives the engine load of the internal combustion engine 1 based on the output signal of the accelerator position sensor 7, and also derives the engine rotational speed of the internal combustion engine 1 based on the output value of the crank position sensor 8.

Further, the ECU 10 estimates the flow rate of the exhaust gas flowing into the SCR catalyst 51 (hereinafter, sometimes referred to as the "flow rate of the exhaust gas") based on the output value of the air flow meter 40. In addition, the ECU 10 estimates the temperature of the SCR catalyst 51 (hereinafter, sometimes also referred to as the "SCR temperature") based on the output value of the temperature sensor 56. Here, in FIG. 1, the temperature sensor 56 is arranged in the exhaust passage 5 between the NSR catalyst 50 and the SCR catalyst 51, but the temperature sensor 56 may be arranged at the downstream side of the SCR catalyst 51. Then, in cases where the temperature sensor 56 is arranged of the downstream side of the SCR catalyst 51, too, the ECU 10 can estimate the SCR catalyst temperature based on the output value of the temperature sensor 56. Moreover, a variety of kinds of devices such as the fuel injection valve 3, the throttle valve 41, the urea water addition valve 52, the EGR valve 61 and so on are electrically connected to the ECU 10. Thus, these variety of kinds of devices are controlled by the ECU 10.

(Abnormality Diagnosis for SCR Catalyst)

Next, abnormal diagnosis of the SCR catalyst 51 will be explained. With the construction according to this embodiment, an NOx reduction rate by the SCR catalyst 51 (a ratio of an amount of NOx reduced in the SCR catalyst 51 with respect to an amount of NOx flowing into the SCR catalyst 51) can be calculated based on the detected value of the second NOx sensor 54 and the detected value of the third NOx sensor 55. For that reason, it is considered that abnormality diagnosis of the SCR catalyst 51 is carried out based on the NOx reduction rate. However, in this embodiment, as indicated in FIG. 1, the NSR catalyst 50 is arranged in the exhaust passage 5 at the upstream side of the SCR catalyst 51. For that reason first, most of the NOx discharged from the internal combustion engine 1 is stored into the NSR catalyst 50. Accordingly, in the normal case, the flow rate of NOx flowing into the SCR catalyst 51 (the inflow amount of NOx) becomes a relatively small amount. Then, when the inflow amount of NOx is relatively small, a difference in the NOx reduction rate is hard to develop between the case where abnormality has occurred in the SCR catalyst 51, and the case where the SCR catalyst 51 is normal. For that reason, when abnormality diagnosis of the SCR catalyst 51 is carried out based on the NOx reduction rate, there is a fear that accurate diagnosis can not be made.

Figure 2:
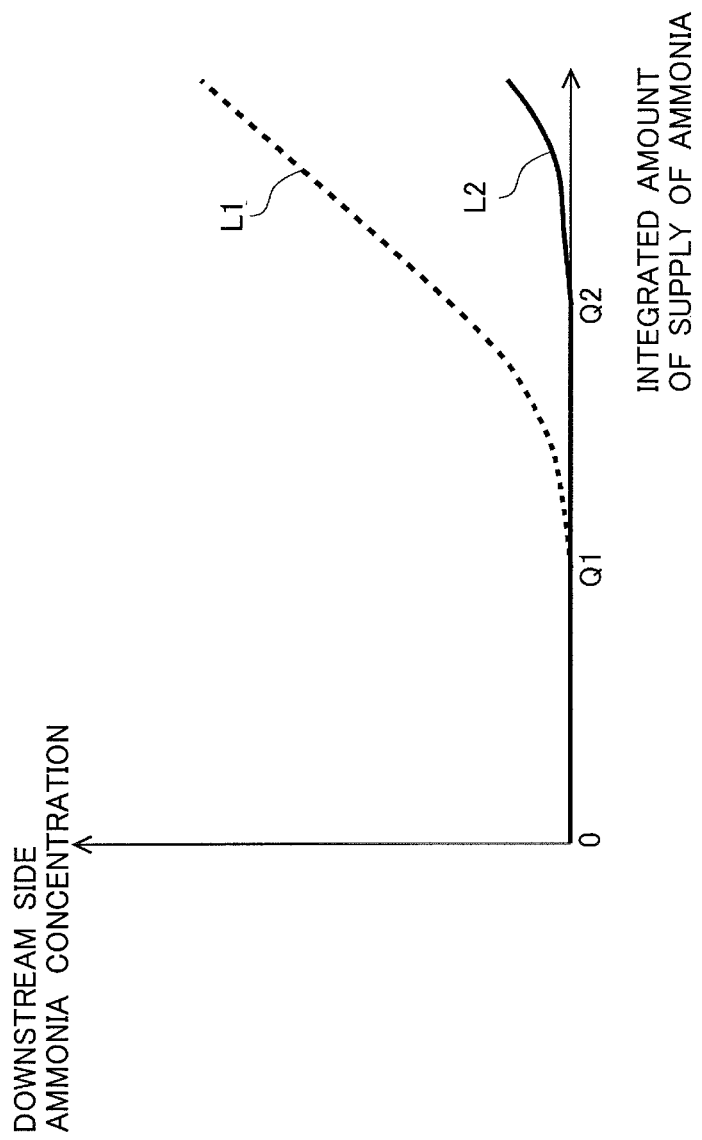
FIG. 2 is a view indicating a correlation between an integrated amount of ammonia supplied to an SCR catalyst and a downstream side ammonia concentration.

Accordingly, in this embodiment, the abnormality diagnosis of the SCR catalyst 51 is carried out to the SCR catalyst 51 based on a concentration of ammonia in the exhaust gas at the downstream side of the SCR catalyst 51 (hereinafter, sometimes also referred to as a "downstream side ammonia concentration") at the time when ammonia is supplied. Here, a difference in the change over time of the downstream side ammonia concentration between the case where the SCR catalyst 51 is normal and the case where it is abnormal will be explained based on FIG. 2. FIG. 2 is a view indicating a correlation between an integrated amount of ammonia supplied to the SCR catalyst 51 and the downstream side ammonia concentration. In FIG. 2, an axis of abscissa represents an integrated amount of supply of ammonia to the SCR catalyst 51 (an integrated value of the amount of ammonia supplied to the SCR catalyst 51 by adding urea water thereto from the urea water addition valve 52). Also, in FIG. 2, an axis of ordinate represents the downstream side ammonia concentration. In addition, in FIG. 2, a broken line L1 indicates a correlation in the case where the SCR catalyst 51 is in a predetermined abnormal state (i.e., a state in which it should be diagnosed that abnormality has occurred in the SCR catalyst, in the abnormality diagnosis). Also, in FIG. 2, a solid line L2 indicates a correlation in the case where the SCR catalyst 51 is in a predetermined normal state (i.e., a state in which it should be diagnosed that the SCR catalyst is normal, in the abnormality diagnosis).

As indicated in the broken line L1 of FIG. 2, in cases where the SCR catalyst 51 is in the predetermined abnormal state, the downstream side ammonia concentration begins to rise from zero when the integrated amount of supply of ammonia reaches Q1. On the other hand, as indicated in the broken line L1 of FIG. 2, in cases where the SCR catalyst 51 is in the predetermined normal state, the downstream side ammonia concentration begins to rise from zero when the integrated amount of supply of ammonia reaches Q2. Thus, the downstream side ammonia concentration begins to rise from zero in this manner, because ammonia begins to slip from the SCR catalyst 51. In other words, even in cases where the SCR catalyst 51 is in the predetermined abnormal state, substantially all of the ammonia supplied is adsorbed to the SCR catalyst 51 until the integrated amount of supply of ammonia reaches Q1. Then, when the integrated amount of supply of ammonia reaches Q1, i.e., when the amount of adsorbed ammonia in the SCR catalyst 51 reaches Q1, ammonia begins to slip from the SCR catalyst 51. Hereinafter, the amount of adsorbed ammonia in the SCR catalyst 51 at this time is referred to as a "first slip development adsorption amount". In other words, the first slip development adsorption amount is an amount of adsorption of ammonia in the SCR catalyst 51 at the time when ammonia begins to slip from the SCR catalyst 51 in the case where the SCR catalyst 51 is in the predetermined abnormal state. On the other hand, in cases where the SCR catalyst 51 is in the predetermined normal state, substantially all of the ammonia supplied is adsorbed to the SCR catalyst 51 until the integrated amount of supply of ammonia reaches Q2. Then, when the integrated amount of supply of ammonia reaches Q2, i.e., when the amount of adsorbed ammonia in the SCR catalyst 51 reaches Q2, ammonia begins to slip from the SCR catalyst 51. Hereinafter, the amount of adsorbed ammonia in the SCR catalyst 51 at this time is referred to as a "second slip development adsorption amount". In other words, the second slip development adsorption amount is an amount of adsorption of ammonia in the SCR catalyst 51 at the time when ammonia begins to slip from the SCR catalyst 51 in the case where the SCR catalyst 51 is in the predetermined normal state. Then, as indicated in FIG. 2, in the case where the SCR catalyst 51 is abnormal, the slip of ammonia begins to occur in a state where the amount of adsorption of ammonia in the SCR catalyst 51 is smaller, in comparison with the case where the SCR catalyst 51 is normal. In other words, the first slip development adsorption amount is an amount which is smaller than the second slip development adsorption amount.

Accordingly, in this embodiment, the ECU 10 estimates the first estimated adsorption amount and the second estimated adsorption amount, respectively. Here, the first slip estimated amount is an amount of adsorption of ammonia in the SCR catalyst 51 when it is assumed that the SCR catalyst 51 is in the predetermined abnormal state. Also, the second estimated adsorption amount is an amount of adsorption of ammonia in the SCR catalyst 51 when it is assumed that the SCR catalyst 51 is in the normal state. Then, at the time of carrying out the abnormality diagnosis of the SCR catalyst 51, diagnostic supply control to supply urea water from the urea water addition valve 52 is carried out, in such a manner that the first estimated adsorption amount estimated by the ECU 10 becomes equal to or more than the first predetermined adsorption amount which is equal to or more than the first slip development adsorption amount, and the second estimated adsorption amount estimated by the ECU 10 becomes smaller than the second predetermined adsorption amount which is equal to or less than the second slip development adsorption amount.

Figure 3:
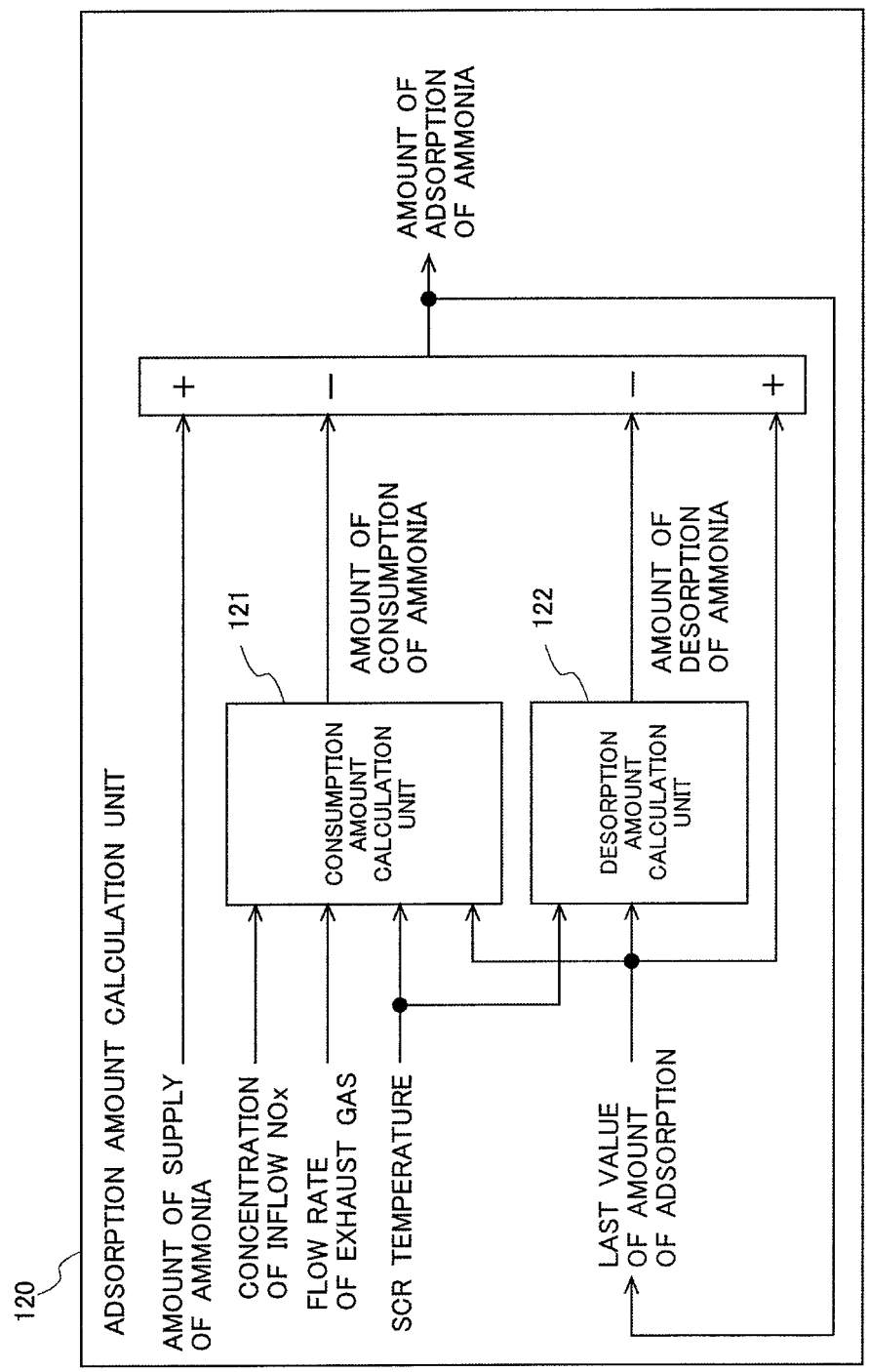
FIG. 3 is a block diagram indicating a function of an adsorption amount calculation unit in an ECU.

Here, a specific example of a method for calculating the amount of adsorption of ammonia in the SCR catalyst 51 according to this embodiment will be explained based on FIG. 3. FIG. 3 is a block diagram indicating a function of an adsorption amount calculation unit 120 in the ECU 10. The adsorption amount calculation unit 120 is a functional unit for calculating the amount of adsorption of ammonia in the SCR catalyst 51, and is achieved by executing a predetermined program in the ECU 10.

In the adsorption amount calculation unit 120, a current amount of adsorbed ammonia is calculated by integrating an amount of supply of ammonia which is an amount of ammonia supplied to the SCR catalyst 51, an amount of consumption of ammonia which is an amount of ammonia consumed for the reduction of NOx in the SCR catalyst 51, and an amount of desorption of ammonia which is an amount of ammonia to desorb from the SCR catalyst 51. Specifically, the adsorption amount calculation unit 120 has a consumption amount calculation unit 121 and a desorption amount calculation unit 122. The consumption amount calculation unit 121 calculates, as the amount of consumption of ammonia, an amount of ammonia consumed for the reduction of NOx in the SCR catalyst 51 during a predetermined period of time corresponding to an operation (calculation) period of the amount of adsorbed ammonia. The desorption amount calculation unit 122 calculates, as the amount of desorption of ammonia, an amount of ammonia to desorb from the SCR catalyst during the predetermined period of time. In addition, in the adsorption amount calculation unit 120, an amount of ammonia supplied to the SCR catalyst 51 during the predetermined period of time is estimated as the amount of supply of ammonia. As mentioned above, the ammonia supplied to the SCR catalyst 51 is produced by hydrolysis of the urea contained in the urea water added from the urea water addition valve 52. For that reason, the amount of supply of ammonia can be estimated based on the amount of urea water added from the urea water addition valve 52 during the predetermined period of time.

In addition, a concentration of NOx in the exhaust gas flowing into the SCR catalyst 51 (a concentration of inflow NOx), the flow rate of the exhaust gas, the temperature of the SCR catalyst 51 (the SCR temperature), and an amount of adsorption of ammonia in the SCR catalyst 51 calculated by the last calculation (the last value of the amount of adsorption) are inputted into the consumption amount calculation unit 121. Here, note that the concentration of inflow NOx is detected by the second NOx sensor 54. Here, the NOx reduction rate in the SCR catalyst 51 has a correlation with the flow rate of the exhaust gas, the SCR temperature, and the amount of adsorption of ammonia in the SCR catalyst 51. Accordingly, in the consumption amount calculation unit 121, an NOx reduction rate, which is estimated to be exhibited by the SCR catalyst 51 at the current point in time (hereinafter, referred to as an "estimated NOx reduction rate"), is calculated based on the flow rate of the exhaust gas, the SCR temperature, and the last value of the amount of adsorption thus inputted. Further, in the consumption amount calculation unit 121, an amount of NOx flowing into the SCR catalyst 51 in the predetermined period of time (hereinafter, referred to as an "inflow amount of NOx") is calculated based on the concentration of inflow NOx and the flow rate of the exhaust gas thus inputted. Then, the amount of consumption of ammonia is calculated based on the estimated NOx reduction rate and the inflow amount of NOx thus calculated. On the other hand, the SCR temperature and the last value of the amount of adsorption are inputted to the desorption amount calculation unit 122. Then, the amount of desorption of ammonia is calculated based on the SCR temperature and the last value of the amount of adsorption thus inputted.

Then, in cases where the first estimated adsorption amount is calculated in the adsorption amount calculation unit 120, the consumption amount calculation unit 121 and the desorption amount calculation unit 122 calculate the amount of consumption of ammonia and the amount of desorption of ammonia, assuming that the SCR catalyst 51 is in the predetermined abnormal state. In addition, in cases where the second estimated adsorption amount is calculated in the adsorption amount calculation unit 120, the consumption amount calculation unit 121 and the desorption amount calculation unit 122 calculate the amount of consumption of ammonia and the amount of desorption of ammonia, assuming that the SCR catalyst 51 is in the predetermined normal state. For example, as maps each indicating a correlation of the flow rate of exhaust gas, the SCR temperature, and the last value of the amount of adsorption with the estimated NOx reduction rate, the consumption amount calculation unit 121 may have two maps including a map in the case of assuming that the SCR catalyst 51 is in the predetermined abnormal state, and a map in the case of assuming that the SCR catalyst 51 is in the predetermined normal state. In this case, by using the respective maps, the consumption amount calculation unit 121 calculates an estimated NOx reduction rate at the time of assuming that the SCR catalyst 51 is in the predetermined abnormal state, and an estimated NOx reduction rate at the time of assuming that the SCR catalyst 51 is in the predetermined normal state, respectively. Further, based on the estimated NOx reduction rates thus calculated in the respective cases and the inflow amount of NOx, the consumption amount calculation unit 121 calculates an amount of consumption of ammonia at the time of assuming that the SCR catalyst 51 is in the predetermined abnormal state, and an amount of consumption of ammonia at the time of assuming that the SCR catalyst 51 is in the predetermined normal state, respectively. Moreover, as maps each indicating a correlation of the SCR temperature and the last value of the amount of adsorption with the amount of desorption of ammonia, the desorption amount calculation unit 122 may have two maps including a map in the case of assuming that the SCR catalyst 51 is in the predetermined abnormal state, and a map in the case of assuming that the SCR catalyst 51 is in the predetermined normal state. In this case, by using the respective maps, the desorption amount calculation unit 122 calculates an amount of desorption of ammonia at the time of assuming that the SCR catalyst 51 is in the predetermined abnormal state, and an amount of desorption of ammonia at the time of assuming that the SCR catalyst 51 is in the predetermined normal state. Then, the first estimated adsorption amount is calculated by adding the amount of consumption of ammonia and the amount of desorption of ammonia calculated assuming that the SCR catalyst 51 is in the predetermined abnormal state as mentioned above, and the amount of supply of ammonia. Also, the second estimated adsorption amount is calculated by adding the amount of consumption of ammonia and the amount of desorption of ammonia calculated assuming that the SCR catalyst 51 is in the predetermined normal state as mentioned above, and the amount of supply of ammonia.

However, the estimation method of the first estimated adsorption amount and the second estimated adsorption amount is not limited to the above-mentioned method, but may adopt other well-known techniques.

Subsequently, the changes over time of the first estimated adsorption amount and the second estimated adsorption amount at the time when the diagnostic supply control is carried out will be explained based on FIG. 4 and FIG. 5.

Figure 4:
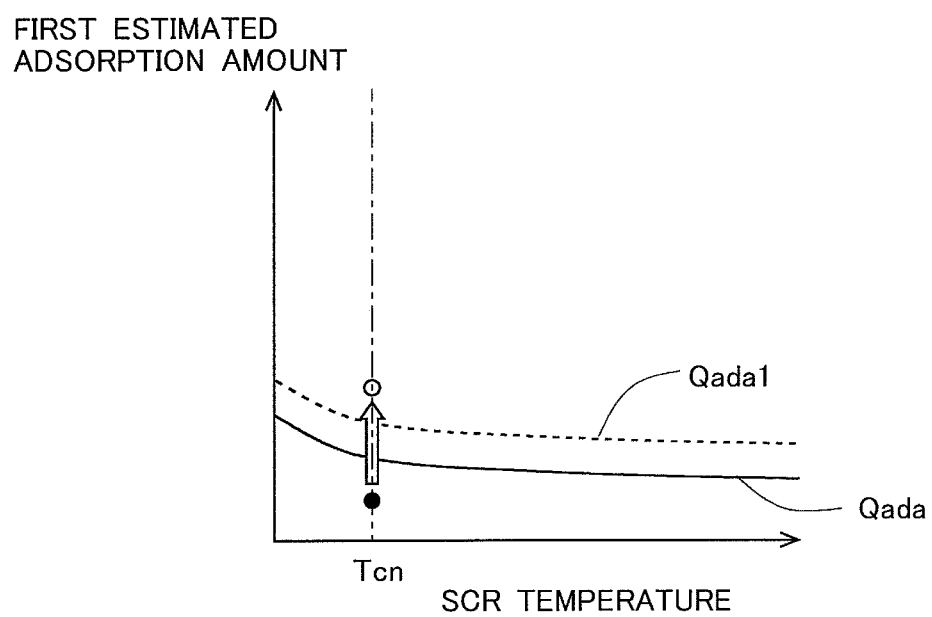
FIG. 4 is a first view indicating a correlation of a first slip development adsorption amount Qada and a first predetermined adsorption amount Qada1 with a temperature of the SCR catalyst.

FIG. 4 is a view indicating a correlation of the first slip development adsorption amount Qada and the first predetermined adsorption amount Qada1 with the temperature of the SCR catalyst 51 (SCR temperature). In FIG. 4, a solid line indicates the first slip development adsorption amount Qada, and a broken line indicates the first predetermined adsorption amount Qada1. Here, as indicated in FIG. 4, the first predetermined adsorption amount Qada1 is set to a value which is obtained by adding a predetermined margin to the first slip development adsorption amount Qada. However, the first predetermined adsorption amount Qada1 may be made the same value as the first slip development adsorption amount Qada. Also, FIG. 5 is a view indicating a correlation of the second slip development adsorption amount Qadn and the second predetermined adsorption amount Qadn2 with the temperature of the SCR catalyst 51 (SCR temperature). Here, as indicated in FIG. 5, the second predetermined adsorption amount Qadn2 is set to a value which is obtained by subtracting a predetermined margin from the second slip development adsorption amount Qadn. However, the second predetermined adsorption amount Qadn2 may be made the same value as the second slip development adsorption amount Qadn.

Figure 5:
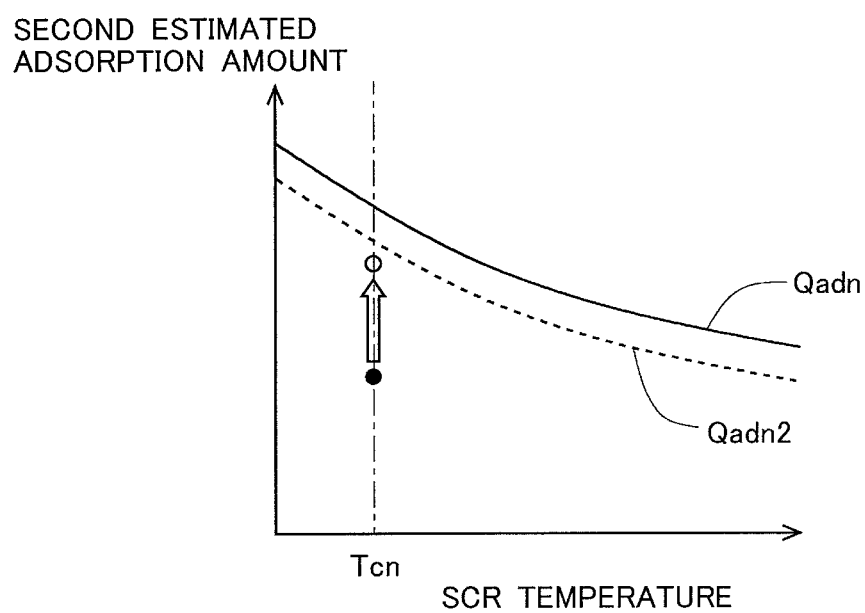
FIG. 5 is a first view indicating a correlation of a second slip development adsorption amount Qadn and a second predetermined adsorption amount Qadn2 with the temperature of the SCR catalyst.

Moreover, in FIG. 4 and FIG. 5, black circles indicate the first estimated adsorption amount and the second estimated adsorption amount at the same time point (i.e., at the time of the same SCR temperature Tcn) before the execution of the diagnostic supply control, respectively. As indicated by a black circle in FIG. 4, the first estimated adsorption amount before the execution of the diagnostic supply control is an amount smaller than the first slip development adsorption amount Qada. Also, as indicated by a black circle in FIG. 5, the second estimated adsorption amount before the execution of the diagnostic supply control is an amount smaller than the second predetermined adsorption amount Qadn2. Here, when the first estimated adsorption amount is the amount smaller than the first slip development adsorption amount Qada, as indicated in FIG. 4, ammonia is hard to slip from the SCR catalyst 51, even if abnormality has occurred in the SCR catalyst 51. For that reason, under such a situation, it is difficult to carry out abnormality diagnosis of the SCR catalyst 51 based on the concentration of ammonia at the downstream side of the SCR catalyst 51 in an accurate manner.

Accordingly, in this embodiment, at the time of performing abnormality diagnosis of the SCR catalyst 51, ammonia is supplied to the SCR catalyst 51 by carrying out the diagnostic supply control, so that the amount of adsorption of ammonia in the SCR catalyst 51 is made to increase.

When ammonia is supplied to the SCR catalyst 51 by carrying out the diagnostic supply control, each of the first estimated adsorption amount and the second estimated adsorption amount increases, as indicated by arrow shows in FIG. 4 and FIG. 5. Then, amounts of increase at this time in the first estimated adsorption amount and the second estimated adsorption amount are substantially equal to each other. In FIG. 4 and FIG. 5, white circles indicate the first estimated adsorption amount and the second estimated adsorption amount after the execution of the diagnostic supply control, respectively. Here, as indicated by a white circle in FIG. 4, the first estimated adsorption amount after the execution of the diagnostic supply control is an amount equal to or more than the first predetermined adsorption amount Qada1. On the other hand, as indicated by a white circle in FIG. 5, even after the execution of the diagnostic supply control, the second estimated adsorption amount is an amount smaller than the second predetermined adsorption amount Qadn2.

As indicated in FIG. 4, when the first estimated adsorption amount becomes equal to or more than the first predetermined adsorption amount Qada1 with ammonia being supplied to the SCR catalyst 51, ammonia will slip from the SCR catalyst 51 if abnormality has occurred in the SCR catalyst 51. However, at this time, when the second estimated adsorption amount is larger than the second slip development adsorption amount Qadn, ammonia will slip from the SCR catalyst 51, even if the SCR catalyst 51 is in the normal state. Accordingly, in cases where such a situation has occurred, too, it is difficult to carry out abnormality diagnosis of the SCR catalyst 51 based on the concentration of ammonia at the downstream side of the SCR catalyst 51 in an accurate manner. Accordingly, in the diagnostic supply control, as indicated in FIG. 4 and FIG. 5, the amount of supply of ammonia to the SCR catalyst 51 is adjusted so that the first estimated adsorption amount becomes an amount equal to or more than the first predetermined adsorption amount Qada1, and the second estimated adsorption amount becomes an amount smaller than the second predetermined adsorption amount Qadn2, after the execution of the diagnostic supply control. By carrying out such diagnostic supply control, ammonia will be supplied to the SCR catalyst 51 in such an amount that when abnormality has occurred in the SCR catalyst 51, ammonia slips from the SCR catalyst 51, but when the SCR catalyst 51 is in the normal state, ammonia does not slip from the SCR catalyst 51. As a result, it becomes possible to carry out abnormality diagnosis of the SCR catalyst 51 based on the concentration of ammonia at the downstream side of the SCR catalyst 51 in an accurate manner.

(Abnormality Diagnosis Flow)

Figure 6:
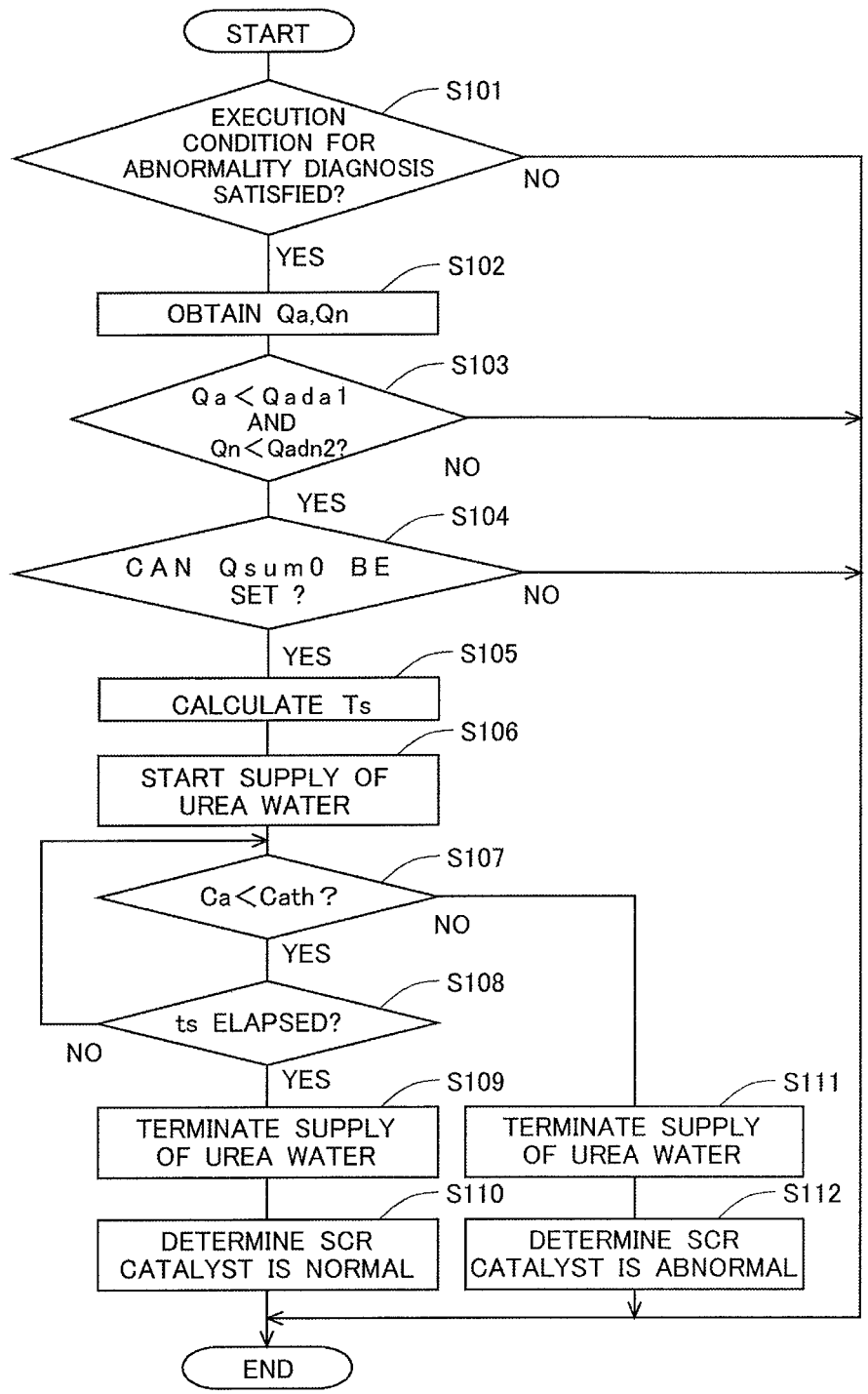
FIG. 6 is a flow chart indicating a flow of abnormality diagnosis of the SCR catalyst according to this embodiment.

Here, a flow or routine for abnormality diagnosis of the SCR catalyst according to this embodiment will be explained based on FIG. 6. FIG. 6 is a flow chart indicating the flow or routine for abnormality diagnosis of the SCR catalyst according to this embodiment. In this embodiment, this routine is carried out at a predetermined interval in a repeated manner by the ECU 10 during the operation of the internal combustion engine 1. Here, note that as mentioned above, in this embodiment, during the operation of the internal combustion engine 1, the ECU 10 performs a routine different from this routine, whereby the first estimated adsorption amount and the second estimated adsorption amount are estimated in a repeated manner at a predetermined operation interval.

In this routine, first in step S101, it is determined whether an execution condition for abnormality diagnosis of the SCR catalyst 51 has been satisfied. As the execution condition for abnormality diagnosis of the SCR catalyst 51, it can be exemplified that warming-up of the SCR catalyst 51 is terminated after starting of the internal combustion engine 1, and that the operating state of the internal combustion engine 1 is a steady state operation. In addition, the execution condition for abnormality diagnosis of the SCR catalyst 51 may include that after the last abnormality diagnosis of the SCR catalyst 51 was terminated, a vehicle with the internal combustion engine 1 mounted thereon has traveled a predetermined distance, or that the internal combustion engine 1 has been operated for a predetermined period of time, or the like. Here, note that these execution conditions are some examples, and in step S301, it can be determined based on well-known techniques whether the execution condition for abnormality diagnosis of the SCR catalyst 51 is satisfied. In cases where a negative determination is made in step S101, the execution of this routine is once ended. On the other hand, in cases where an affirmative determination is made in step S101, the processing of step S102 is then carried out.

In step S102, a first estimated adsorption amount Qa and a second estimated adsorption amount Qn at the current point in time, which are estimated by the execution of a routine different from this routine, are obtained. Subsequently, in step S103, it is determined whether the first estimated adsorption amount Qa at the current point in time obtained in step S102 is smaller than the first predetermined adsorption amount Qada1, and the second estimated adsorption amount Qn at the current point in time obtained in step S102 is smaller than the second predetermined adsorption amount Qadn2. Here, note that the first predetermined adsorption amount Qada1 and the second predetermined adsorption amount Qadn2 in step S103 are values which are decided based on the temperature of the SCR catalyst 51 at the current point in time. The correlation between the temperature of the SCR catalyst 51 and the first predetermined adsorption amount Qada1 as indicated in FIG. 4, and the correlation between the temperature of the SCR catalyst 51 and the second predetermined adsorption amount Qadn2 as indicated in FIG. 5, have been stored in advance in a ROM of the ECU 10, as maps or functions, respectively. Then, the ECU 10 decides the first predetermined adsorption amount Qada1 and the second predetermined adsorption amount Qadn2 in step S103 by using these maps or functions. In cases where a negative determination is made in step S103, the execution of this routine is once ended. On the other hand, in cases where an affirmative determination is made in step S103, the processing of step S104 is then carried out.

In step S104, it is determined whether an amount of supply Qsum0 at the time of diagnosis, which is an amount of supply of urea water from the urea water addition valve 52 in the diagnostic supply control, can be set. Here, the amount of supply Qsum0 at the time of diagnosis is a value at which when urea water in the amount of supply Qsum0 at the time of diagnosis is supplied from the urea water addition valve 52, the first estimated adsorption amount Qa becomes equal to or more than the first predetermined adsorption amount Qada1, but the second estimated adsorption amount Qn is maintained at an amount smaller than the second predetermined adsorption amount Qadn2. In step S103, the first estimated adsorption amount Qa and the second estimated adsorption amount Qn at the time when the diagnostic supply control is carried out are estimated, based on the first estimated adsorption amount Qa and the second estimated adsorption amount Qn at the current point in time obtained in step S102, and an amount of increase in each of the first and second estimated adsorption amounts which will be increased by the urea water to be newly supplied from the urea water addition valve 52. At this time, in the ECU 10, the first estimated adsorption amount Qa and the second estimated adsorption amount Qn in the case where the diagnostic supply control is carried out are estimated by the above-mentioned adsorption amount calculation unit 120. Then, based on the estimated value of each of the first and second estimated adsorption amounts Qa, Qn, it is determined whether the amount of supply Qsum0 at the time of diagnosis as mentioned above can be set. In cases where a negative determination is made in step S104, the execution of this routine is once ended. In other words, in order to make possible the abnormality diagnosis of the SCR catalyst 51 based on the concentration of ammonia at the downstream side of the SCR catalyst 51 by carrying out the diagnostic supply control in this embodiment, an affirmative determination needs to be made in steps S103 and S104 before the execution of the diagnostic supply control.

In cases where an affirmative determination is made in step S104, it can be determined that the diagnostic supply control is able to be carried out. Accordingly, in this case, in step S105, based on the amount of supply Qsum0 at the time of diagnosis which has been determined to be able to be set in step S104, a urea water supply period ts is calculated which is a period of time in which urea water is supplied from the urea water addition valve 52 in the diagnostic supply control. In other words, the urea water supply period ts calculated in step S105 is a period of time for supplying urea water in the amount of supply Qsum0 at the time of diagnosis from the urea water addition valve 52.

Subsequently, in step S106, the supply of urea water from the urea water addition valve 52 is started. In other words, the execution of the diagnostic supply control is started. Subsequently, in step S107, it is determined whether a detected value Ca by the third NOx sensor 55 is smaller than a concentration threshold value Cath. Here, note that in the diagnostic supply control, ammonia is supplied to the SCR catalyst 51 so that the amount of adsorption of ammonia in the SCR catalyst 51 is increased. In other words, a larger amount of ammonia than an amount becoming an equivalent to the inflow amount of NOx to the SCR catalyst 51 is supplied. Accordingly, during the execution of the diagnostic supply control, substantially all the NOx flowing into the SCR catalyst 51 is reduced. For that reason, the detected value of the third NOx sensor 55 during the execution of the diagnostic supply control can be handled as the concentration of ammonia in the exhaust gas. Thus, in this embodiment, the third NOx sensor 55 corresponds to an "ammonia detection unit" according to the present disclosure. However, an ammonia sensor for detecting the concentration of ammonia in the exhaust gas may be arranged, in place of the third NOx sensor 55. In this case, the ammonia sensor corresponds to the "ammonia detection unit" according to the present disclosure. In addition, the concentration threshold value Cath is a threshold value for determining whether ammonia has slipped from the SCR catalyst 51.

In other words, when the detected value Ca of the third NOx sensor 55 becomes equal to or more than the concentration threshold value Cath, it can be judged that the slip of ammonia from the SCR catalyst 51 has occurred. This concentration threshold value Cath has been set in advance based on experiments, etc., and stored in the ROM of the ECU 10. In cases where an affirmative determination is made in step S107, the processing of step S108 is then carried out, whereas in cases where a negative determination is made in step S107, the processing of step S111 is then carried out.

In step S108, it is determined whether the urea water supply period is calculated in step S105 has elapsed after the supply of the urea water from the urea water addition valve 52 is started in step S106. In cases where a negative determination is made in step S108, the processing of the step S107 is carried out again. On the other hand, in cases where an affirmative determination is made in step S108, then in step S109, the supply of the urea water from the urea water addition valve 52 is terminated. In other words, the execution of the diagnostic supply control is terminated. In this case, even if the urea water in the amount of supply Qsum0 at the time of diagnosis is supplied from the urea water addition valve 52, i.e., even if the first estimated adsorption amount Qa has reached an amount equal to or more than the first predetermined adsorption amount Qada1, the slip of ammonia from the SCR catalyst 51 will not occur. For that reason, in this case, in step S110, a determination is made that the SCR catalyst 51 is normal. Thereafter, the execution of this routine is once ended.

On the other hand, in cases where a negative determination is made in step S107, the processing of step S111 is then carried out. In step S111, too, the supply of the urea water from the urea water addition valve 52 is terminated. However, in this case, during the supply of the urea water in the amount of supply Qsum0 at the time of diagnosis from the urea water addition valve 52, i.e., when the second estimated adsorption amount Qn is smaller than the second predetermined adsorption amount Qadn2, the slip of ammonia from the SCR catalyst 51 will occur. For that reason, in this case, in step S112, a determination is made that abnormality has occurred in the SCR catalyst 51. Thereafter, the execution of this flow is once ended. In cases where it is diagnosed that the SCR catalyst 51 is abnormal in step S112 of this routine, the user of the vehicle with the internal combustion engine 1 mounted thereon is notified of the diagnosis result.

Here, note that in the above-mentioned routine, at a point in time when the urea water supply period is has elapsed after the supply of the urea water from the urea water addition valve 52 is started in step S106, it may be determined, similar to step S107, whether the detected value Ca of the third NOx sensor 55 is smaller than the concentration threshold value Cath. In this case, too, when the detected value Ca of the third NOx sensor 55 is smaller than the concentration threshold value Cath, it can be determined that the SCR catalyst 51 is normal. On the other hand, when the detected value Ca of the third NOx sensor 55 is equal to or more than the concentration threshold value Cath, it can be determined that abnormality has occurred in the SCR catalyst 51.

(Decreasing Control)

Figure 7:
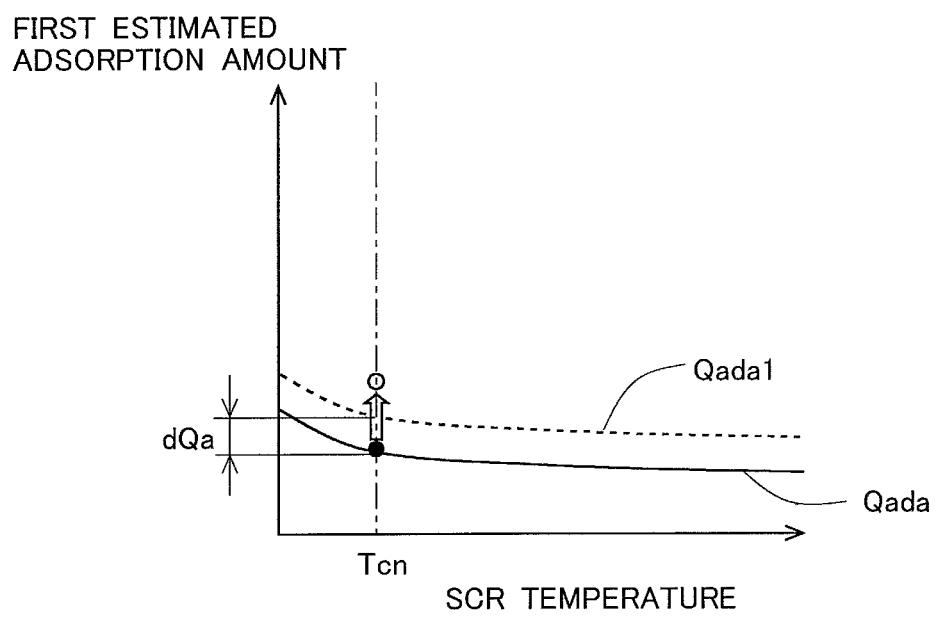
FIG. 7 is a second view indicating a correlation of the first slip development adsorption amount Qada and the first predetermined adsorption amount Qada1 with the temperature of the SCR catalyst.
Figure 8:
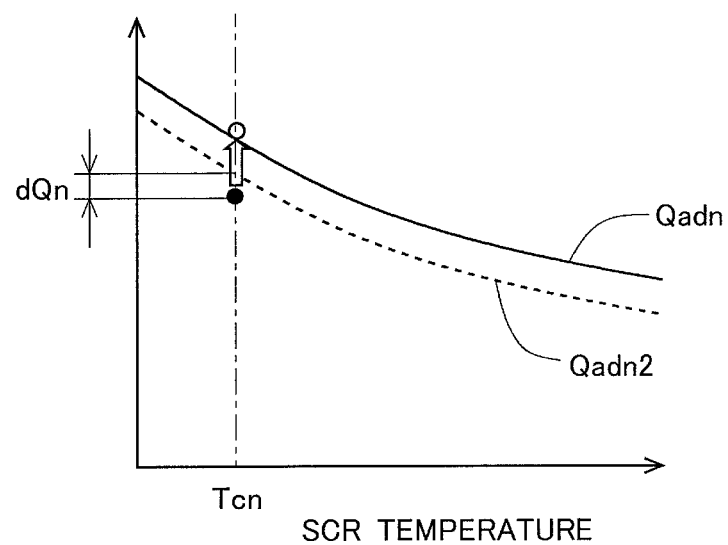
FIG. 8 is a second view indicating a correlation of the second slip development adsorption amount Qadn and the second predetermined adsorption amount Qadn2 with the temperature of the SCR catalyst.

In cases where the abnormality diagnosis of the SCR catalyst 51 as mentioned above is carried out and it is diagnosed that the SCR catalyst 51 is normal, the normal operation of the internal combustion engine 1 is continued. Then, the estimation of the first estimated adsorption amount and the second estimated adsorption amount by means of the ECU 10 is also continued. Here, the changes over time of the first estimated adsorption amount and the second estimated adsorption amount after the end of the diagnostic supply control carried out for the abnormality diagnosis of the SCR catalyst 51 will be explained based on FIGS. 7 and 8. FIG. 7 is a view indicating a correlation of the first slip development adsorption amount Qada and the first predetermined adsorption amount Qada1 with the temperature of the SCR catalyst 51 (SCR temperature), similar to FIG. 4. Also, FIG. 8 is a view indicating a correlation of the second slip development adsorption amount Qadn and the second predetermined adsorption amount Qadn2 with the temperature of the SCR catalyst 51 (SCR temperature), similar to FIG. 5. Here, it is assumed that after the end of the execution of the diagnostic supply control, too, the SCR temperature is maintained at the same temperature Tcn as that during the execution of the diagnostic supply control.

As mentioned above, when the diagnostic supply control is carried out, the first estimated adsorption amount increases to an amount equal to or more than the first predetermined adsorption amount Qada1 (i.e., increases to an amount indicated by the white circle in FIG. 4). Then, after the end of the execution of the diagnostic supply control, the first estimated adsorption amount decreases quickly to the first slip development adsorption amount Qada, as indicated by a black circle in FIG. 7. This is because in cases where it is assumed that the SCR catalyst 51 is in the predetermined abnormal state, a portion of the first estimated adsorption amount exceeding the first slip development adsorption amount Qada will slip from the SCR catalyst 51. On the other hand, when the diagnostic supply control is carried out, the second estimated adsorption amount increases within a range less than the second predetermined adsorption amount Qadn2 (i.e., increases up to an amount indicated by the white circle in FIG. 5). Then, even after the end of the execution of the diagnostic supply control, the second estimated adsorption amount is hard to decrease from the once increased amount (i.e., the amount indicated by the white circle in FIG. 5), as indicated by a black circle in FIG. 8. This is because the second estimated adsorption amount is smaller than the second slip development adsorption amount Qadn, and so the slip of ammonia from the SCR catalyst 51 does not occur, in cases where it is assumed that the SCR catalyst 51 is in the predetermined normal state.

Then, when the first estimated adsorption amount becomes an amount as indicated by the black circle in FIG. 7 and the second estimated adsorption amount becomes an amount as indicated by the black circle in FIG. 8, a difference (hereinafter, sometimes also referred to as a "second difference") dQn between the second estimated adsorption amount and the second predetermined adsorption amount Qadn2 will become smaller than a difference (hereinafter, sometimes also referred to as a "first difference") dQa between the first estimated adsorption amount and the first predetermined adsorption amount Qada1. In that case, when the next abnormality diagnosis of the SCR catalyst 51 is to be carried out, if the diagnostic supply control is carried out in order to increase the first estimated adsorption amount again to up an amount equal to or more than the first predetermined adsorption amount Qada1 (i.e., the amount indicated by the white circle in FIG. 7), the second estimated adsorption amount will increase by the same extent as an increased amount of the first estimated adsorption amount, and hence, will become an amount equal to or more than the second predetermined adsorption amount Qadn2 (i.e., the amount indicated by the white circle in FIG. 8). In other words, it becomes impossible to set the amount of supply Qsum0 at the time of diagnosis at which by carrying out the diagnostic supply control, the first estimated adsorption amount becomes the amount equal to or more than the first predetermined adsorption amount Qada1, but the second estimated adsorption amount Qn is maintained at the amount smaller than the second predetermined adsorption amount Qadn2. As a result, in step S104 in the routine indicated in FIG. 6, it becomes impossible to make an affirmative determination, so the next abnormality diagnosis of the SCR catalyst 51 can be performed.

Accordingly, in this embodiment, the ECU 10 carries out supply decreasing control so as to decrease the amount of adsorption of ammonia in the SCR catalyst 51, after the end of the execution of the diagnostic supply control. Here, the supply decreasing control is control which adjusts an amount of addition of urea water from the urea water addition valve 52 so as to make the amount of supply of ammonia to the SCR catalyst 51 smaller than an amount which becomes an equivalent to the inflow amount of NOx. When such supply decreasing control is carried out, an amount of ammonia consumed for the reduction of NOx in the SCR catalyst 51 becomes more than an amount of ammonia newly supplied to the SCR catalyst 51. For that reason, the amount of adsorption of ammonia in the NOx catalyst 51 is decreased. Then, by carrying out this supply decreasing control, the amount of adsorption of ammonia in the SCR catalyst 51 is made to decrease, thereby making the second difference dQn larger than the first difference dQa.

Here, when the supply decreasing control is carried out, both the first estimated adsorption amount and the second estimated adsorption amount will decrease. However, how the first estimated adsorption amount and the second estimated adsorption amount change (or decrease) over time at this time are different from each other. Specifically, as mentioned above, after the end of the execution of the diagnostic supply control, the first estimated adsorption amount quickly decreases up to the first slip development adsorption amount Qada. However, when the amount of adsorption of ammonia in the SCR catalyst 51 decreases up to the first slip development adsorption amount Qada or less, the ammonia adsorbed to the SCR catalyst 51 becomes hard to be consumed for the reduction of NOx. For that reason, after that, the decreasing rate of the first estimated adsorption amount becomes very small. On the other hand, when the supply decreasing control is carried out, the second estimated adsorption amount decreases relatively quickly. For that reason, in cases where the supply decreasing control is carried out after the end of the execution of the diagnostic supply control, the decreasing rate of the first estimated adsorption amount after the first estimated adsorption amount has decreased to the first slip development adsorption amount Qada becomes smaller than the decreasing rate of the second estimated adsorption amount. Accordingly, by carrying out the supply decreasing control continuously to some extent, the second difference dQn can be made larger than the first difference dQa.

For that reason, by decreasing the amount of adsorption of ammonia in the SCR catalyst 51 by means of the supply decreasing control, the first estimated adsorption amount can be again made to become the amount indicated by the black circle in FIG. 4, and at the same time, the second estimated adsorption amount can be again made to become the amount indicated by the black circle in FIG. 5. As a result, it becomes possible to make the first estimated adsorption amount equal to or more than the first predetermined adsorption amount Qada1, and at the same time to make the second estimated adsorption amount smaller than the second predetermined adsorption amount Qadn2, when the first estimated adsorption amount and the second estimated adsorption amount have again increased to the same extent. In other words, when the routine indicated in FIG. 6 is carried out, it becomes possible to set the amount of supply Qsum0 at the time of diagnosis. Accordingly, at the time of the next abnormality diagnosis of the SCR catalyst, it becomes possible to carry out the diagnostic supply control.

(Routine of Supply Decreasing Control)

Figure 9:
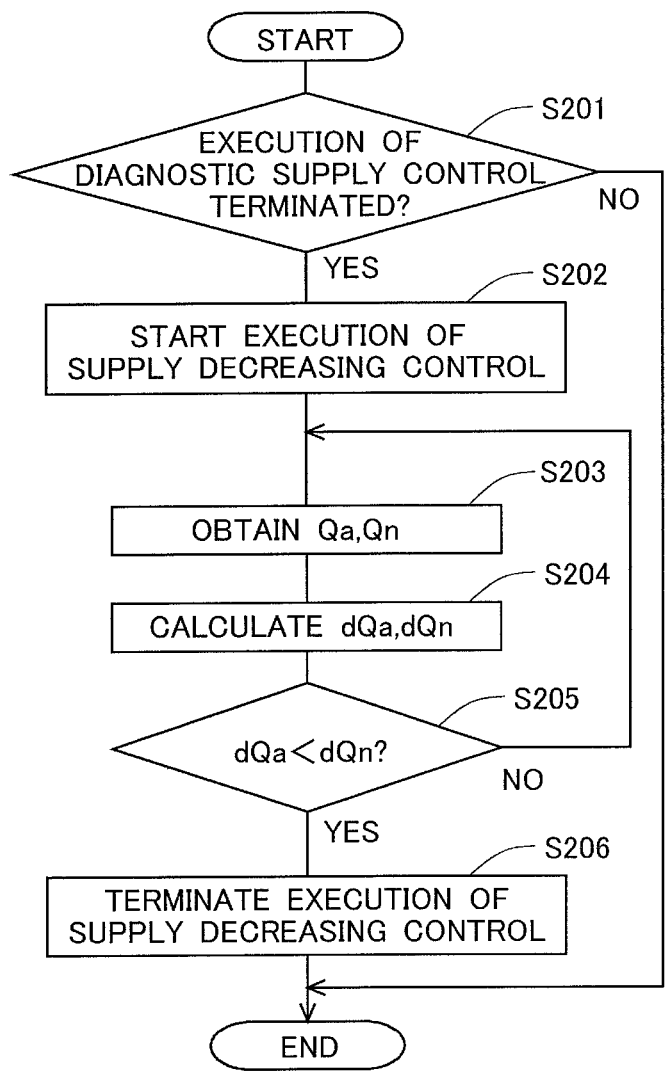
FIG. 9 is a flow chart indicating a flow of supply decreasing control according to a first embodiment.

Here, a flow or routine of the supply decreasing control according to this embodiment will be explained based on FIG. 9. FIG. 9 is a flow chart indicating the flow or routine of the supply decreasing control according to this embodiment. In this embodiment, this routine is carried out at a predetermined interval in a repeated manner by the ECU 10 during the operation of the internal combustion engine 1. Here, note that during the execution of this routine, the ECU 10 performs a routine different from this routine, whereby the first estimated adsorption amount and the second estimated adsorption amount are estimated in a repeated manner at a predetermined operation interval.

In this routine, first in step S201, it is determined whether the execution of the diagnostic supply control has been terminated. In other words, it is determined whether the step S109 in the routine indicated in FIG. 6 has been carried out. In cases where a negative determination is made in step S201, the execution of this routine is once ended. On the other hand, in cases where an affirmative determination is made in step S201, then in step S202, the execution of the supply decreasing control is started. In other words, the amount of addition of urea water from the urea water addition valve 52 is decreased from an amount of addition at normal time (i.e., an amount at which the amount of supply of ammonia to the SCR catalyst 51 becomes an equivalent to the inflow amount of NOx).

Then, in step S203, the first estimated adsorption amount Qa and the second estimated adsorption amount Qn at the current point in time, which are estimated by the execution of a routine different from this routine, are obtained. Subsequently, in step S204, the first difference dQa and the second difference dQn are calculated based on the first estimated adsorption amount Qa and the second estimated adsorption amount Qn estimated in step S203, respectively. Thereafter, in step S205, by making a comparison between the first difference dQa and the second difference dQn calculated in step S204, it is determined whether the second difference dQn has become larger than the first difference dQa. In cases where a negative determination is made in step S205, the processing of the step S203 is carried out again. In other words, the execution of the supply decreasing control is continued. On the other hand, in cases where an affirmative determination is made in step S205, then in step S206, the execution of the supply decreasing control is terminated. In other words, the amount of addition of urea water from the urea water addition valve 52 is returned to the amount of addition at normal time. Thereafter, the execution of this routine is once ended.

As described above, in this embodiment, by carrying out the diagnostic supply control at the time of performing the abnormality diagnosis of the SCR catalyst 51 and at the same time carrying out the supply decreasing control after the execution of the diagnostic supply control, the amount of adsorption of ammonia in the SCR catalyst 51 can be adjusted to an amount suitable for the abnormality diagnosis of the SCR catalyst 51 based on the ammonia slipping from the SCR catalyst 51, in a repeated manner. Accordingly, it becomes possible to ensure an opportunity for the execution of the abnormality diagnosis of the SCR catalyst 51 in an appropriate manner.

Second Embodiment

The schematic construction of an internal combustion engine and its intake and exhaust systems according to a second embodiment is the same as that in the first embodiment. In addition, in this second embodiment, too, at the time of carrying out abnormality diagnosis of the SCR catalyst 51, the same diagnostic supply control as in the first embodiment is carried out. Then, this second embodiment is different from the first embodiment in that temperature rise control in addition to the supply decreasing control is carried out as the control for decreasing the amount of adsorption of ammonia in the SCR catalyst 51, after the end of the execution of the diagnostic supply control.

(Temperature Rise Control)

The temperature rise control is the control which raises the temperature of the SCR catalyst 51 to a predetermined desorption temperature at which ammonia desorbs from the SCR catalyst 51, even if the SCR catalyst 51 is in the predetermined normal state. In this second embodiment, too, when the execution of the diagnostic supply control is terminated, the supply decreasing control is carried out, similar to the first embodiment. Then, in cases where the second difference dQn does not become larger than the first difference dQa after the execution of the supply decreasing control is started until a predetermined period of time elapses, the temperature rise control in addition to the supply decreasing control is carried out.

In the internal combustion engine 1, the temperature rise control is achieved by carrying out auxiliary fuel injection in an auxiliary fuel injection period which is after a main fuel injection period, and in which at least a part of injected fuel is discharged from the internal combustion engine 1 together with exhaust gas without being used for combustion. When unburnt fuel components are discharged from the internal combustion engine 1 by the execution of the auxiliary fuel injection, the unburnt fuel components will be oxidized in the NSR catalyst 50. With the heat of oxidation generated by oxidation of these unburnt fuel components, the temperature of the exhaust gas flowing into the SCR catalyst 51 goes up, and the temperature of the SCR catalyst 51 accordingly goes up. Here, note that the temperature rise control may be achieved by the control to raise the temperature of the exhaust gas discharged from the internal combustion engine 1. In addition, an electric heater for heating the exhaust gas flowing into the SCR catalyst 51 or the SCR catalyst 51 itself may be newly arranged, so that the temperature rise control may be achieved by heating of the electric heater.

As the temperature of the SCR catalyst 51 goes up, an upper limit adsorption amount (saturation adsorption amount) of ammonia in the SCR catalyst 51 becomes smaller. For that reason, when the SCR catalyst 51 is raised to the predetermined desorption temperature at which the upper limit adsorption amount becomes smaller than a current amount of adsorbed ammonia in the SCR catalyst 51, ammonia desorbs from the SCR catalyst 51. Accordingly, the amount of adsorption of ammonia in the SCR catalyst 51 can be decreased by carrying out the temperature rise control. For that reason, a decrease in the amount of adsorption of ammonia in the SCR catalyst 51 can be promoted by carrying out the temperature rise control in addition to the supply decreasing control.

(Routine of Temperature Rise Control)

Figure 10:
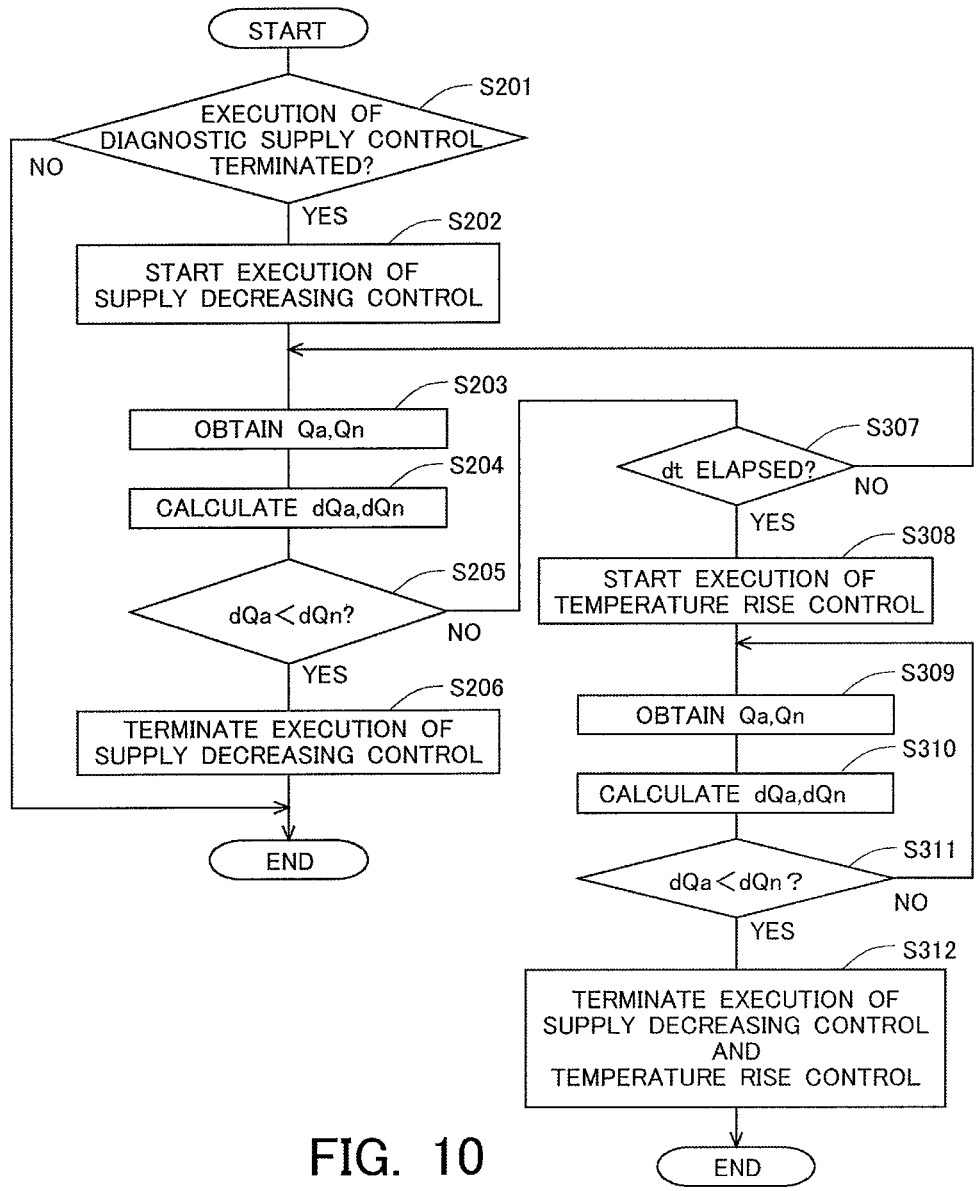
FIG. 10 is a flow chart indicating a flow of supply decreasing control and temperature rise control according to a second embodiment.

Here, a flow or routine of the temperature rise control according to this second embodiment will be explained based on FIG. 10. FIG. 10 is a flow chart indicating a flow or routine of the supply decreasing control and the temperature rise control according to this second embodiment. In this second embodiment, this routine is carried out at a predetermined interval in a repeated manner by the ECU 10 during the operation of the internal combustion engine 1. Here, note that processings from step S201 to step S206 in this routine are the same as those carried out in steps of the same reference numerals in the flow chart indicated in FIG. 9. For that reason, the explanation of the processings of these steps is omitted. In addition, during the execution of this routine, the ECU 10 performs a routine different from this routine, whereby the first estimated adsorption amount and the second estimated adsorption amount are estimated in a repeated manner at a predetermined operation interval.

In this routine, in cases where a negative determination is made in step S205, the processing of step S307 is then carried out. In step S307, it is determined whether a predetermined period of time dt has passed after the execution of the supply decreasing control is started in step S202. The predetermined period of time dt is a period of time set in advance in order to decrease the second estimated adsorption amount sufficiently before the execution timing of the next abnormality diagnosis of the SCR catalyst 51. In cases where a negative determination is made in step S307, the processing of the step S203 is then carried out again.

On the other hand, in cases where an affirmative determination is made in step S307, then in step S308, the execution of the temperature rise control is started. In other words, the execution of auxiliary fuel injection in the internal combustion engine 1 is started. Here, in the temperature rise control, an amount of fuel injection by the auxiliary fuel injection is adjusted so that the SCR catalyst 51 becomes the predetermined desorption temperature. In addition, the predetermined desorption temperature becoming a target temperature at this time may be set based on the second estimated adsorption amount Qn. Here, note that in cases where the temperature rise control is carried out in step S308, too, the execution of the supply decreasing control is continued.

Subsequently, in step S309, the first estimated adsorption amount Qa and the second estimated adsorption amount Qn at the current point in time are estimated. Then, in step S310, the first difference dQa and the second difference dQn are calculated based on the first estimated adsorption amount Qa and the second estimated adsorption amount Qn estimated in step S309, respectively. Thereafter, in step S311, by making a comparison between the first difference dQa and the second difference dQn calculated in step S310, it is determined whether the second difference dQn has become larger than the first difference dQa. In cases where a negative determination is made in step S311, the processing of step S309 is carried out again. In other words, the execution of the supply decreasing control and the temperature rise control is continued. On the other hand, in cases where an affirmative determination is made in step S311, then in step S312, the execution of the supply decreasing control and the temperature rise control is terminated. Thereafter, the execution of this routine is once ended.

(Modification)

Here, note that in the above-mentioned second embodiment, the temperature rise control is carried out after the predetermined period of time has elapsed from the start of execution of the supply decreasing control, but the temperature rise control may be carried out together with the supply decreasing control, immediately after the end of the execution of the diagnostic supply control. In addition, it is not necessarily necessary to carry out the temperature rise control together with the supply decreasing control, but the temperature rise control may be carried out in place of the supply decreasing control. However, in cases where the temperature rise control is carried out, there is a fear that it may be accompanied by deterioration of fuel economy and release of the ammonia desorbed from the SCR catalyst 51 to the outside. Thus, by using the temperature rise control together with the supply decreasing control, the deterioration of fuel economy and the release of the ammonia to the outside can be suppressed.

Third Embodiment

The schematic construction of an internal combustion engine and its intake and exhaust systems according to a third embodiment is the same as that in the first embodiment. In addition, in this third embodiment, too, at the time of carrying out abnormality diagnosis of the SCR catalyst 51, the same diagnostic supply control as in the first embodiment is carried out. Then, this third embodiment is different from the first embodiment in that oxidation control in addition to the supply decreasing control is carried out as the control for decreasing the amount of adsorption of ammonia in the SCR catalyst 51, after the end of the execution of the diagnostic supply control.

(Oxidation Control)

The oxidation control is to control the temperature of the SCR catalyst 51 to a temperature at which ammonia can be oxidized, as well as control the oxygen concentration of the exhaust gas flowing into the SCR catalyst 51 to an oxygen concentration at which ammonia can be oxidized. In this third embodiment, too, when the execution of the diagnostic supply control is terminated, the supply decreasing control is carried out, similar to the first embodiment. Then, in cases where the second difference dQn does not become larger than the first difference dQa after the execution of the supply decreasing control is started until a predetermined period of time elapses, the oxidation control in addition to the supply decreasing control is carried out.

In the oxidation control, the temperature of the SCR catalyst 51 is adjusted so that it becomes a temperature at which the ammonia adsorbed to the SCR catalyst 51 can be oxidized within a range in which the ammonia does not desorb therefrom. At this time, in cases where it is necessary to raise the temperature of the SCR catalyst 51, the same control as the temperature rise control in the second embodiment is carried out. However, the target temperature at this time is set to a temperature lower than the predetermined desorption temperature according to the temperature rise control in the second embodiment. Moreover, in the oxidation control, the oxygen concentration of the exhaust gas is adjusted so that it becomes an oxygen concentration at which the ammonia adsorbed to the SCR catalyst 51 can be oxidized. At this time, in cases where it is necessary to raise the oxygen concentration of the exhaust gas, the EGR ratio of intake air is decreased by making small the degree of opening of the EGR valve 61. When the EGR ratio of intake air is decreased, the flow rate of the fresh air (air) flowing into the internal combustion engine 1 is increased. As a result, the oxygen concentration of the exhaust gas will rise. Here, note that in cases where an air supply device for supplying secondary air into the exhaust gas is newly arranged in the exhaust passage 5, the oxygen concentration of the exhaust gas may be raised by supplying secondary air into the exhaust gas by means of the air supply device.

When the oxidation control is carried out, the ammonia adsorbed to the SCR catalyst 51 is oxidized to produce NOx. Then, the NOx thus produced is reduced by the ammonia remaining in the SCR catalyst 51 used as the reducing agent. Accordingly, by carrying out the oxidation control, the amount of adsorption of ammonia in the SCR catalyst 51 can be decreased, while suppressing the outflow of ammonia from the SCR catalyst 51 as well as the outflow of NOx from the SCR catalyst 51. For that reason, a decrease in the amount of adsorption of ammonia in the SCR catalyst 51 can be promoted by carrying out the oxidation control in addition to the supply decreasing control. Moreover, the release of the ammonia desorbed from the SCR catalyst 51 to the outside can be suppressed by carrying out the oxidation control in place of the temperature rise control according to the second embodiment.

(Routine of Oxidation Control)

Figure 11:
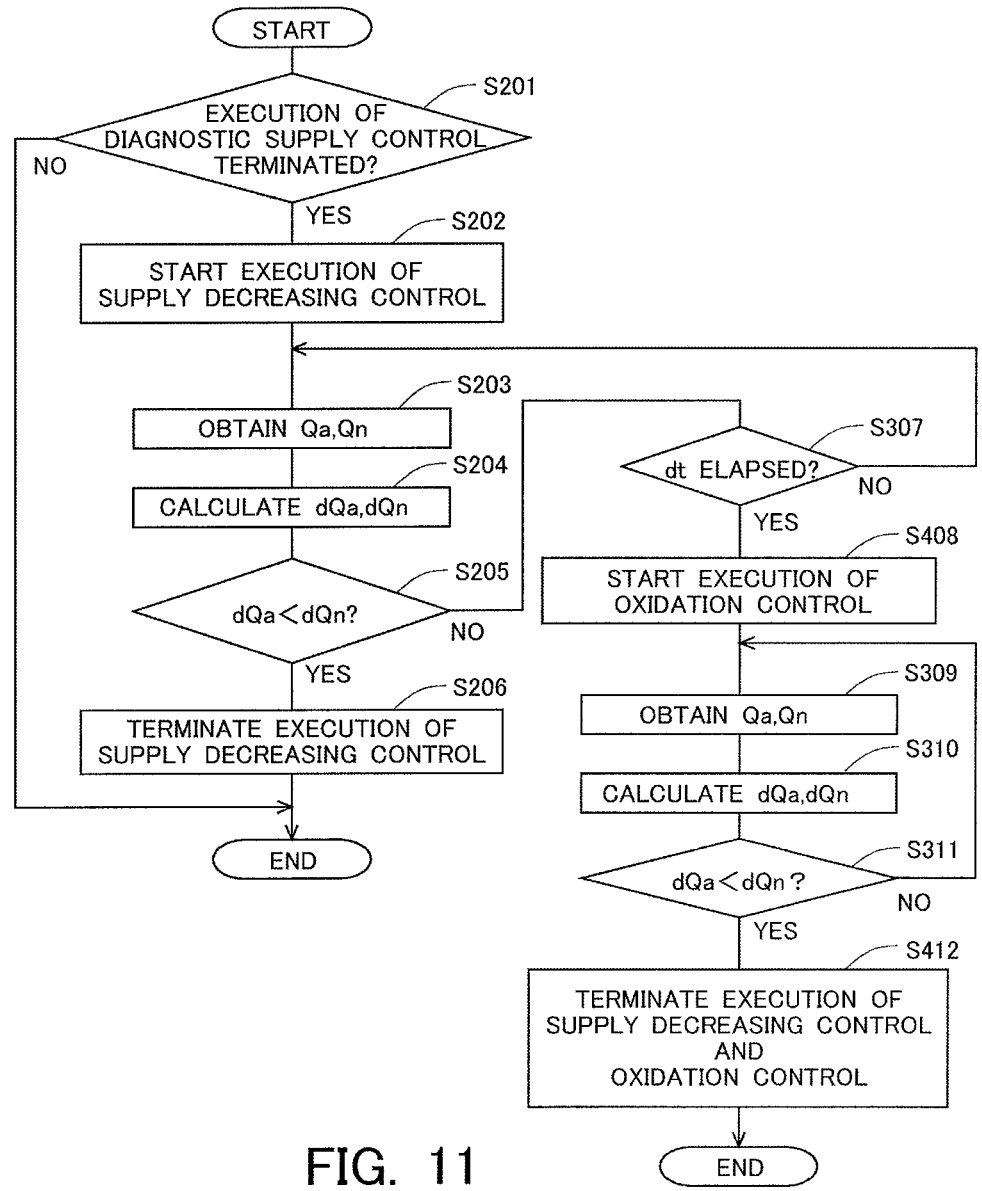
FIG. 11 is a flow chart indicating a flow of supply decreasing control and oxidation control according to a third embodiment.

Here, a flow or routine of the oxidation control according to this third embodiment will be explained based on FIG. 11. FIG. 11 is a flow chart indicating the flow or routine of the supply decreasing control and the oxidation control according to this third embodiment. In this third embodiment, this routine is carried out at a predetermined interval in a repeated manner by the ECU 10 during the operation of the internal combustion engine 1. Here, note that processings in steps from S201 to S206, S307, S309, S310 and S311 in this routine are the same as those carried out in steps of the same reference numerals in the flow chart indicated in FIG. 10. For that reason, the explanation of the processings of these steps is omitted. In addition, during the execution of this routine, the ECU 10 performs a routine different from this routine, whereby the first estimated adsorption amount and the second estimated adsorption amount are estimated in a repeated manner at a predetermined operation interval.

In this routine, in cases where an affirmative determination is made in step S307, then in step S408, the execution of the oxidation control is started. In other words, when the temperature of the SCR catalyst 51 is less than the temperature at which ammonia can be oxidized, the execution of the control for raising the temperature of the SCR catalyst 51 is started. In addition, when the oxygen concentration of the exhaust gas is less than the concentration at which ammonia can be oxidized, the execution of the opening control of the EGR valve 61 is started in order to raise the oxygen concentration of the exhaust gas. Here, note that the oxygen concentration of the exhaust gas can be calculated based on the detected value of the air flow meter 40, the amount of fuel injection from the fuel injection valve 3, the EGR ratio of intake air, etc. Moreover, an oxygen sensor for outputting an electrical signal according to the oxygen concentration of the exhaust gas may be newly arranged in the exhaust passage 5 at the upstream side of the SCR catalyst 51, so that the oxygen concentration of the exhaust gas is detected by the oxygen sensor. Also, note that in cases where the oxidation control is carried out in step S408, too, the execution of the supply decreasing control is continued.

Then, in this routine, in cases where a negative determination is made in step S311, the supply decreasing control and the oxidation control are continued. On the other hand, in cases where an affirmative determination is made in step S311, then in step S412, the execution of the supply decreasing control and the oxidation control is terminated. Thereafter, the execution of this routine is once ended.

(First Modification)

Here, note that in the above-mentioned third embodiment, the oxidation control is carried out after the predetermined period of time has elapsed from the start of execution of the supply decreasing control, but the oxidation control may be carried out together with the supply decreasing control, immediately after the end of the execution of the diagnostic supply control. In addition, it is not necessarily necessary to carry out the oxidation control together with the supply decreasing control, but the oxidation control may be carried out in place of the supply decreasing control.

(Second Modification)

In addition, as mentioned above, in cases where the oxidation control is carried out, the NOx produced by oxidation of ammonia is reduced by the ammonia remaining in the SCR catalyst 51. Here, the rate of reduction of NOx in the SCR catalyst 51 changes according to the amount of adsorption of ammonia in the SCR catalyst 51. Accordingly, when the amount of adsorption of ammonia in the SCR catalyst 51 gradually decreases by the execution of the oxidation control, the rate of reduction of NOx in the SCR catalyst 51 gradually becomes lower.

Figure 12:
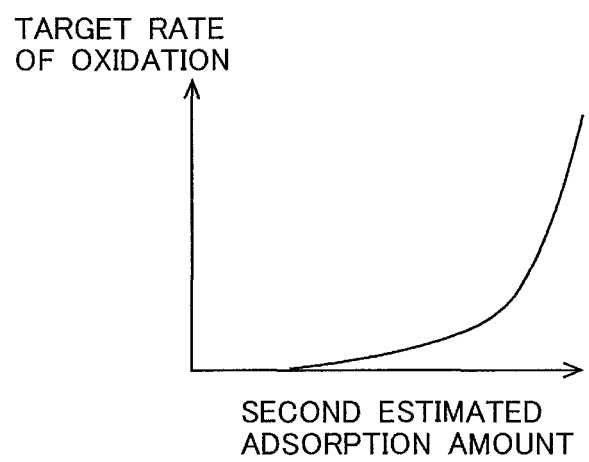
FIG. 12 is a view indicating a correlation between a second estimated adsorption amount and a target rate of oxidation in a second modification of the third embodiment.

Accordingly, in the oxidation control, a target rate of oxidation in the oxidation control may be changed according to the second estimated adsorption amount. FIG. 12 is a view indicating a correlation between the second estimated adsorption amount and the target rate of oxidation in a second modification of the third embodiment. In FIG. 12, the axis of abscissa represents the second estimated adsorption amount, and the axis of ordinate represents the target rate of oxidation. According to FIG. 12, when the second estimated adsorption amount gradually decreases by the execution of the oxidation control, the target rate of oxidation will be accordingly made smaller gradually. Here, note that the rate of oxidation of ammonia in the SCR catalyst 51 can be changed by adjusting the temperature of the SCR catalyst 51 or the oxygen concentration of the exhaust gas.

In this manner, by changing the rate of oxidation of ammonia in the SCR catalyst 51 according to the second estimated adsorption amount, a decrease in the amount of adsorption of ammonia in the SCR catalyst 51 can be promoted, while suppressing the NOx produced in the SCR catalyst 51 by the oxidation control from flowing out from the SCR catalyst 51 without being reduced in the SCR catalyst 51.

What is claimed is:

1. An abnormality diagnosis system for an exhaust gas purification apparatus which includes:
    an NOx selective reduction catalyst that is arranged in an exhaust passage of the internal combustion engine, and reduces NOx in an exhaust gas by using ammonia as a reducing agent; and
    an ammonia supply device that is arranged in the exhaust passage at the upstream side of the NOx selective reduction catalyst, and supplies ammonia to the NOx selective reduction catalyst;
    wherein the abnormality diagnosis system is applied to the exhaust gas purification apparatus and comprises a controller comprising at least one processor configured to carry out an abnormality diagnosis of the NOx selective reduction catalyst; wherein
    the controller
    detects a concentration of ammonia in the exhaust gas at the downstream side of the NOx selective reduction catalyst;
    estimates a first estimated adsorption amount which is an amount of adsorption of ammonia in the NOx selective reduction catalyst at a time when the NOx selective reduction catalyst is in a predetermined abnormal state;
    estimates a second estimated adsorption amount which is an amount of adsorption of ammonia in the NOx selective reduction catalyst at a time when the NOx selective reduction catalyst is in a predetermined normal state;
    carries out diagnostic supply control to supply ammonia by the ammonia supply device at a time of carrying out the abnormality diagnosis of the NOx selective reduction catalyst, in such a manner that when an amount of adsorption of ammonia in the NOx selective reduction catalyst at a time when ammonia begins to slip from the NOx selective reduction catalyst in the case where the NOx selective reduction catalyst is in the predetermined abnormal state is defined as a first slip development adsorption amount, and when an amount of adsorption of ammonia in the NOx selective reduction catalyst at a time when ammonia begins to slip from the NOx selective reduction catalyst in the case where the NOx selective reduction catalyst is in the predetermined normal state is defined as a second slip development adsorption amount, the first estimated adsorption amount becomes equal to or more than a first predetermined adsorption amount which is equal to or more than the first slip development adsorption amount, and the second estimated adsorption amount becomes smaller than a second predetermined adsorption amount which is equal to or less than the second slip development adsorption amount;
    carries out the abnormality diagnosis of the NOx selective reduction catalyst based on the concentration of ammonia detected when the diagnostic supply control Is carried out; and
    carries out decreasing control to decrease the amount of adsorption of ammonia in the NOx selective reduction catalyst after the end of the execution of the diagnostic supply control, in such a manner that a difference between the second estimated adsorption amount and the second predetermined adsorption amount is made larger than a difference between the first estimated adsorption amount and the first predetermined adsorption amount.

2. The abnormality diagnosis system for an exhaust gas purification apparatus as set forth in claim 1, wherein
    the decreasing control includes supply decreasing control to decrease an amount of supply of ammonia from the ammonia supply device to smaller than an amount which becomes an equivalent to an inflow amount of NOx flowing into the NOx selective reduction catalyst.

3. The abnormality diagnosis system for an exhaust gas purification apparatus as set forth in claim 1, wherein
    the decreasing control includes temperature rise control to raise the temperature of the NOx selective reduction catalyst to a predetermined desorption temperature at which ammonia desorbs from the NOx selective reduction catalyst, even if the NOx selective reduction catalyst is in the predetermined normal state.

4. The abnormality diagnosis system for an exhaust gas purification apparatus as set forth in claim 1, wherein
    the decreasing control includes oxidation control to oxidize the ammonia adsorbed to the NOx selective reduction catalyst.

5. The abnormality diagnosis system for an exhaust gas purification apparatus as set forth in claim 4, wherein
    the controller makes a target rate of oxidation in the oxidation control smaller when the second estimated adsorption amount is small, in comparison with when the second estimated adsorption amount is large.

* * * * *